(12) United States Patent
Kimoto et al.

(10) Patent No.: US 8,544,055 B2
(45) Date of Patent: Sep. 24, 2013

(54) COMMUNICATION APPARATUS, CONTROL METHOD, AND COMPUTER-READABLE STORAGE MEDIUM

(75) Inventors: Tatsuya Kimoto, Tokyo (JP); Isao Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 12/970,507

(22) Filed: Dec. 16, 2010

(65) Prior Publication Data

US 2011/0154414 A1    Jun. 23, 2011

(30) Foreign Application Priority Data

Dec. 21, 2009   (JP) ................................. 2009-288810

(51) Int. Cl.
*H04N 5/44* (2011.01)
*H04N 7/16* (2011.01)
*H04N 7/173* (2011.01)
*G06F 15/16* (2006.01)

(52) U.S. Cl.
USPC ........... 725/150; 348/725; 709/228; 725/130; 725/151; 725/153

(58) Field of Classification Search
USPC ................. 725/130–131, 133, 148–151, 153; 710/15, 62, 65, 106, 302, 313; 345/204, 345/211
See application file for complete search history.

(56) References Cited

U.S. PATENT DOCUMENTS

| 8,255,579 B2 * | 8/2012 | Kikkawa et al. .................. 710/8 |
| 2009/0190040 A1 * | 7/2009 | Watanabe et al. ............. 348/725 |
| 2009/0284536 A1 * | 11/2009 | Yoshida ........................ 345/520 |

FOREIGN PATENT DOCUMENTS

JP    2009-229924 A    10/2009

OTHER PUBLICATIONS

High-Definition Multimedia Interface. Specification Version 1.1 May 20, 2004.*

* cited by examiner

*Primary Examiner* — Hai V Tran
(74) *Attorney, Agent, or Firm* — Canon U.S.A., Inc. IP Division

(57) ABSTRACT

A communication apparatus includes a transmission unit, a command processing unit, an acquisition unit, a first determination unit, a second determination unit, and a control unit. The second determination unit determines whether a first physical address acquired from the external apparatus by the acquisition unit matches a second physical address included in a second command received by the command processing unit. The control unit controls the command processing unit to transmit the first command including the first physical address to the external apparatus if it is determined that the first physical address matches the second physical address.

20 Claims, 6 Drawing Sheets

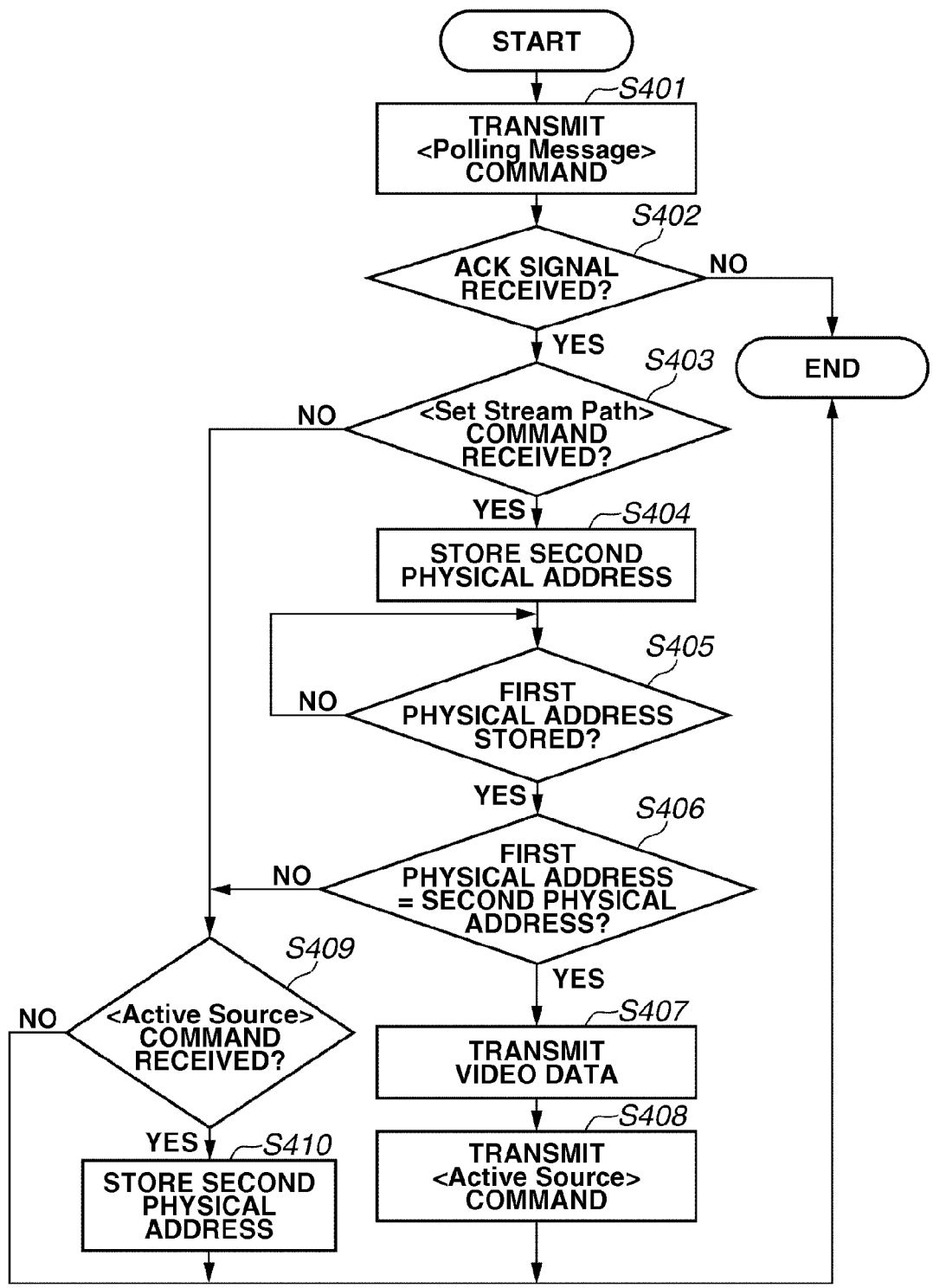

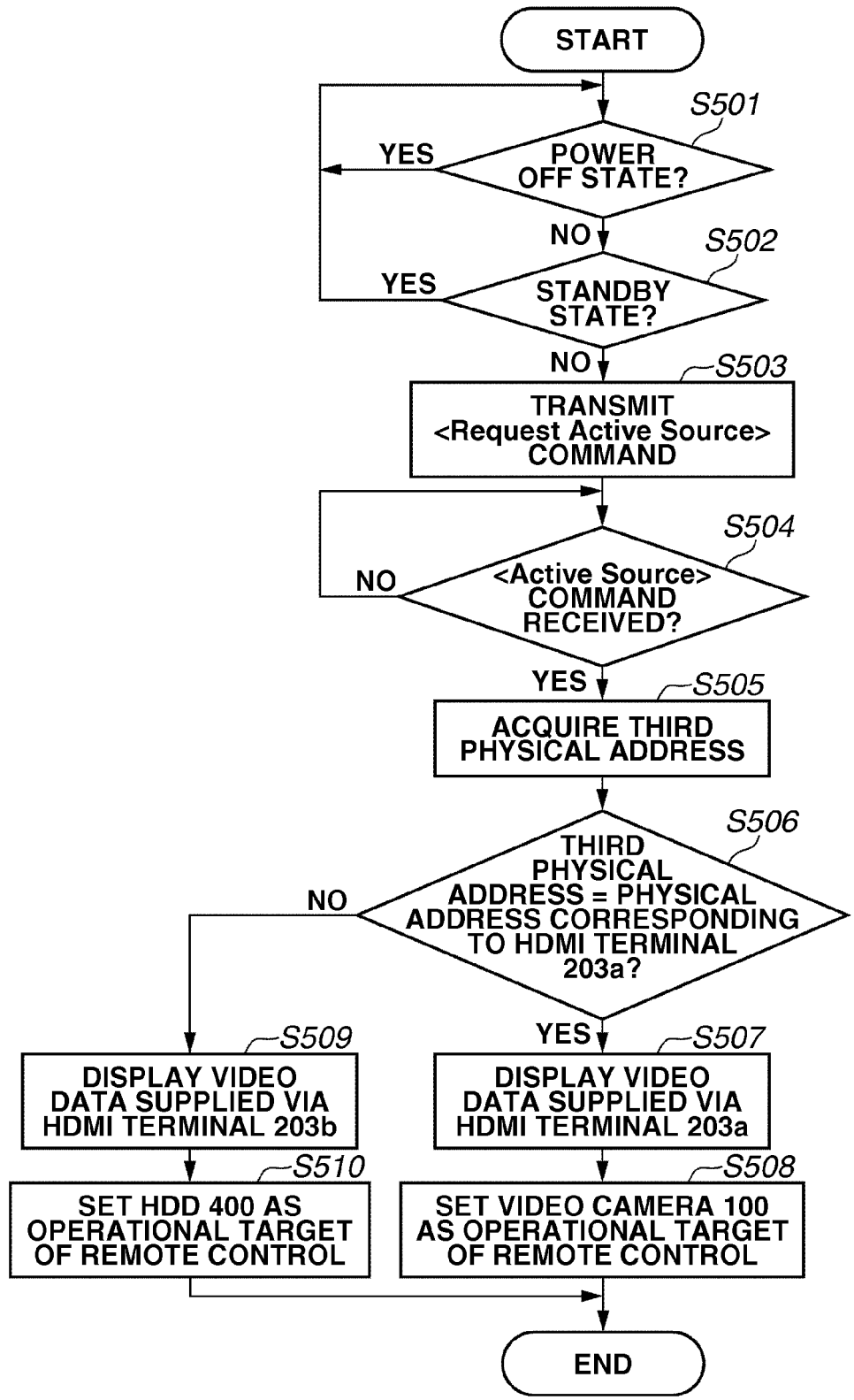

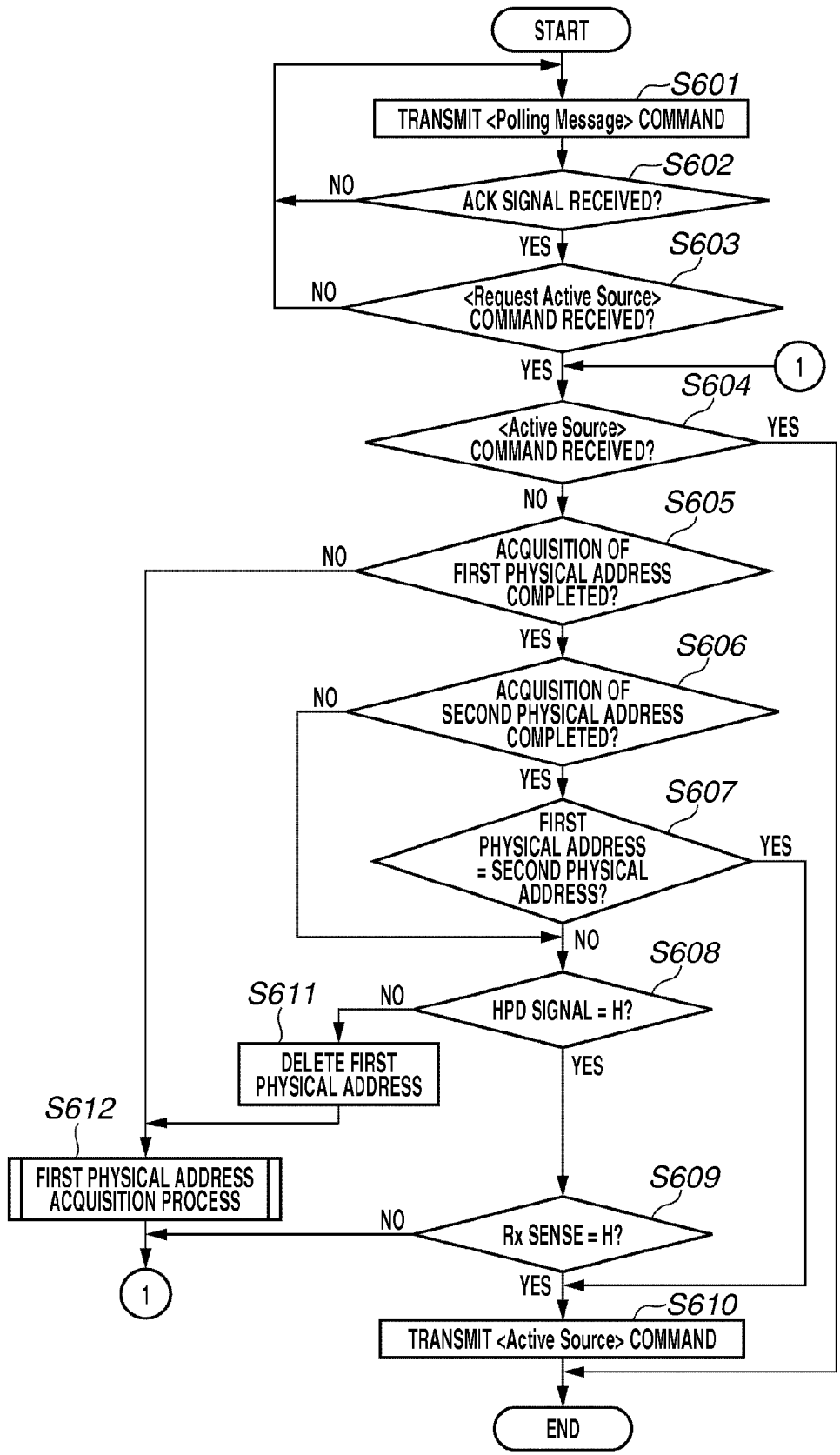

COMMUNICATION APPARATUS, CONTROL METHOD, AND COMPUTER-READABLE STORAGE MEDIUM

BACKGROUND OF THE INVENTION

1. Field of the Invention

The present invention relates to a communication apparatus capable of communicating with an external apparatus, a control method, and a computer-readable storage medium.

2. Description of the Related Art

There is a communication system operable in conformity with High Definition Multimedia Interface (HDMI) (registered trademark) standard, which is hereinafter referred to as an "HDMI system." The HDMI system includes a source apparatus and a sink apparatus. The source apparatus is configured to transmit video data. The sink apparatus displays video data received from the source apparatus on its display device.

Further, in the HDMI system, the sink apparatus is operable based on a CEC command (i.e., a command that conforms to Consumer Electronics Control (CEC) standard) to control source apparatus.

The sink apparatus has a plurality of HDMI terminals and can receive video data from a plurality of source apparatuses connected to respective HDMI terminals.

If the above-described sink apparatus detects any source apparatus being in an "active state" (i.e., a state where the source apparatus can transmit video data to the sink apparatus) among a plurality of source apparatuses connected to respective HDMI terminals, the sink apparatus selects an HDMI terminal to which the detected active source apparatus is connected. Further, the sink apparatus causes the display device to display video data received from the source apparatus corresponding to the selected HDMI terminal and designates the source apparatus corresponding to the selected HDMI terminal as an operational target to be controlled based on a CEC command.

For example, to confirm a source apparatus being currently in the active state, a sink apparatus discussed in Japanese Patent Application Laid-Open No. 2009-229924 is operable to transmit a <Request Active Source> command, which is one of CEC commands, to all source apparatuses connected to respective HDMI terminals.

When the active source apparatus has received the <Request Active Source> command transmitted from the sink apparatus, the active source apparatus generates an <Active Source> command including a physical address of the source apparatus itself. Further, the active source apparatus transmits video data to the sink apparatus and transmits the generated <Active Source> command to the sink apparatus and all of other source apparatuses.

When the sink apparatus has received the <Active Source> command from the source apparatus, the sink apparatus confirms the presence of the source apparatus being currently in the active state. Further, the sink apparatus selects an HDMI terminal corresponding to the source apparatus being currently in the active state among a plurality of HDMI terminals in accordance with the physical address of the source apparatus included in the <Active Source> command received from the source apparatus.

However, the source apparatus having received the <Request Active Source> command from the sink apparatus is not configured to determine whether the physical address of the source apparatus is correct information usable when the sink apparatus recognizes the HDMI terminal corresponding to the source apparatus. In such a case, the source apparatus having received the <Request Active Source> command from the sink apparatus may erroneously transmit an <Active Source> command including an incorrect physical address of the source apparatus to the sink apparatus.

The sink apparatus having received the <Active Source> command from the source apparatus is conventionally configured to simply select an HDMI terminal according to the physical address of the source apparatus, irrespective of correctness of the physical address of the source apparatus included in the <Active Source> command.

Therefore, if the <Active Source> command having been received from the source apparatus includes an incorrect physical address of the source apparatus, the sink apparatus selects an HDMI terminal different from the HDMI terminal corresponding to the source apparatus being currently in the active state.

Thus, even when a source apparatus being currently in an active state is correctly detected from a plurality of source apparatus, the sink apparatus does not select the detected active source apparatus as an operational target to be controlled based on a CEC command.

SUMMARY OF THE INVENTION

According to an aspect of the present invention, a source apparatus is capable of determining whether a physical address of the source apparatus is correct and transmitting the correct physical address of the source apparatus to a sink apparatus.

According to another aspect of the present invention, there is provided a communication apparatus including a transmission unit that transmits video data to an external apparatus; a command processing unit that transmits a first command to the external apparatus; an acquisition unit that acquires a first physical address from predetermined information of the external apparatus; a first determination unit that determines whether a second command is received by the command processing unit; a second determination unit that determines whether the first physical address matches a second physical address included in the second command; and a control unit that controls the command processing unit to transmit the first command including the first physical address to the external apparatus if it is determined that the first physical address matches the second physical address, wherein the first command includes a command for controlling the external apparatus to display the video data transmitted from the transmission unit, and wherein the second command includes a command indicating that the external apparatus displays the video data transmitted from the transmission unit.

According to another aspect of the present invention, there is provided a method for controlling a communication apparatus including a transmission unit that transmits video data to an external apparatus, a command processing unit that transmits a first command to the external apparatus, and an acquisition unit that acquires a first physical address from predetermined information of the external apparatus. The method includes determining whether a second command is received by the command processing unit; determining whether the first physical address matches a second physical address included in the second command; and controlling the command processing unit to transmit the first command including the first physical address to the external apparatus if it is determined that the first physical address matches the second physical address, wherein the first command includes a command for controlling the external apparatus to display the video data transmitted from the transmission unit, and wherein the second command includes a command indicating that the external apparatus displays the video data transmitted from the transmission unit.

According to yet another aspect of the present invention, there is provided a computer-readable storage medium storing a computer-executable program that can be executed by a computer to perform a method of controlling a communication apparatus including a transmission unit that transmits video data to an external apparatus, a command processing unit that transmits a first command to the external apparatus, and an acquisition unit that acquires a first physical address from predetermined information of the external apparatus. The method includes determining whether a second command is received by the command processing unit; determining whether the first physical address matches a second physical address included in the second command; and controlling the command processing unit to transmit the first command including the first physical address to the external apparatus if it is determined that the first physical address matches the second physical address, wherein the first command includes a command for controlling the external apparatus to display the video data transmitted from the transmission unit, and wherein the second command includes a command indicating that the external apparatus displays the video data transmitted from the transmission unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an example of a second physical address acquisition process that can be performed by the communication apparatus according to the first exemplary embodiment of the present invention.

FIG. 5 is a flowchart illustrating an example of a display process that can be performed by the external apparatus according to the first exemplary embodiment of the present invention.

FIG. 6 is a flowchart illustrating an example of a physical address determination process that can be performed by the communication apparatus according to the first exemplary embodiment of the present invention.

DESCRIPTION OF THE EMBODIMENTS

Various exemplary embodiments, features, and aspects of the present invention will be described in detail below with reference to the drawings.

Figure 1:
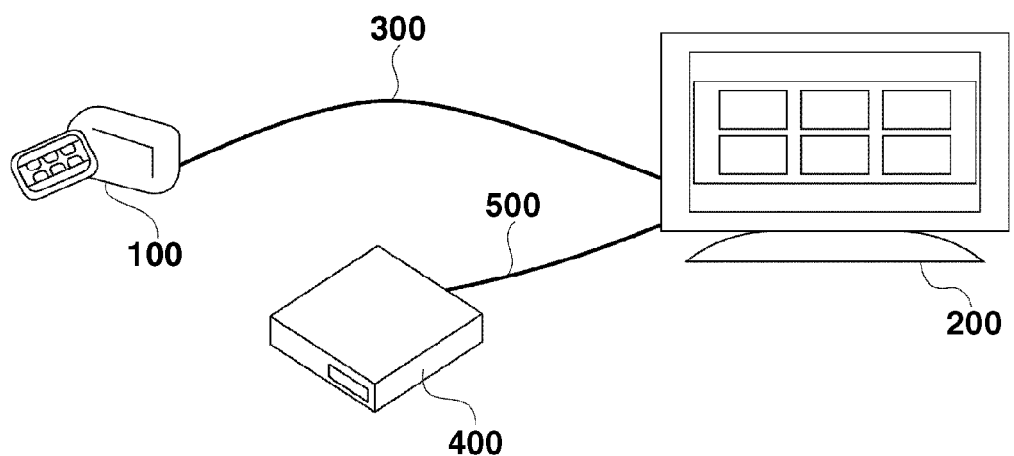
FIG. 1 illustrates an example of a communication system according to a first exemplary embodiment of the present invention.
Figure 2:
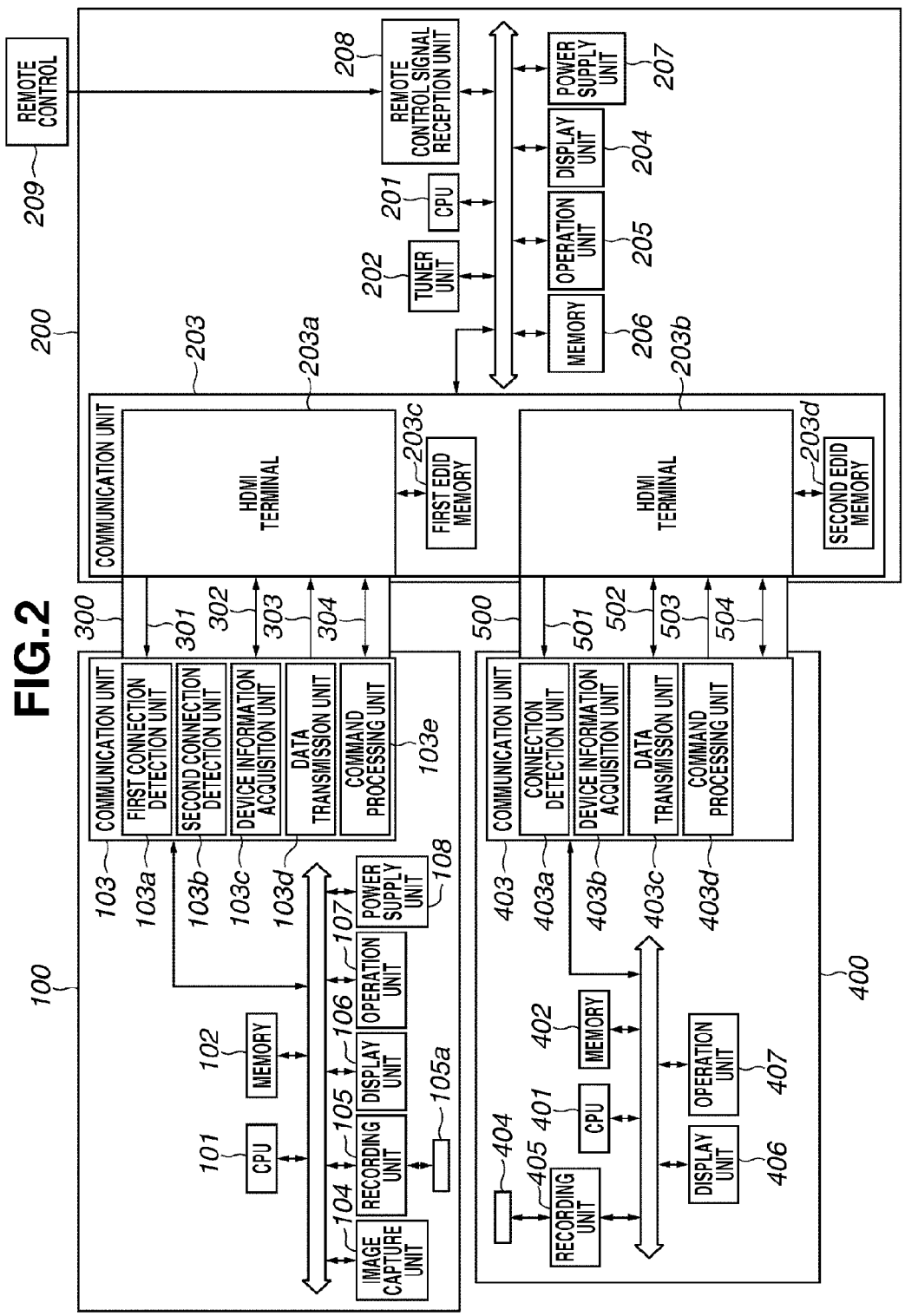
FIG. 2 is a block diagram illustrating an example configuration of a communication apparatus, an external apparatus, and a transmission apparatus according to the first exemplary embodiment of the present invention.

FIG. 1 illustrates an example of a communication system according to a first exemplary embodiment of the present invention. FIG. 2 is a block diagram illustrating an example configuration of a communication apparatus 100, an external apparatus 200, and a transmission apparatus 400 according to the first exemplary embodiment of the present invention.

The communication system according to the first exemplary embodiment, as illustrated in FIG. 1 and FIG. 2, includes the communication apparatus 100, the external apparatus 200, the transmission apparatus 400, a connection cable 300, and a connection cable 500. The communication apparatus 100 and the external apparatus 200 are connected via the connection cable 300. The external apparatus 200 and the transmission apparatus 400 are connected via the connection cable 500. Further, the communication apparatus 100 and the transmission apparatus 400 are connected via the connection cable 300, the external apparatus 200, and the connection cable 500.

In the first exemplary embodiment, the communication apparatus 100, the external apparatus 200, the transmission apparatus 400, the connection cable 300, and the connection cable 500 are operable in conformity with the HDMI standard. Accordingly, the communication apparatus 100 and the transmission apparatus 400 are functionally operable as sources according to the HDMI standard. The external apparatus 200 is functionally operable as a sink according to the HDMI standard.

The connection cable 300 and the connection cable 500 are functionally operable as HDMI cables according to the HDMI standard. The communication apparatus 100 can transmit video data to the external apparatus 200 via the connection cable 300. The communication apparatus 100 and the external apparatus 200 can transmit and receive control commands via the connection cable 300. The transmission apparatus 400 can transmit video data to the external apparatus 200 via the connection cable 500. The communication apparatus 100 and the external apparatus 200 can transmit and receive control commands via the connection cable 500. The communication apparatus 100 and the transmission apparatus 400 can transmit and receive control commands via the connection cable 300, the external apparatus 200, and the connection cable 500.

Further, in the first exemplary embodiment, the communication apparatus 100, the external apparatus 200, and the transmission apparatus 400 are operable in conformity with the Consumer Electronics Control (CEC) standard included in the HDMI standard. The control commands transmitted bidirectionally between the communication apparatus 100 and the external apparatus 200 conform to the CEC standard. Further, the control commands bidirectionally transmitted between the external apparatus 200 and the transmission apparatus 400 conform to the CEC standard. Further, the control commands bidirectionally transmitted between the communication apparatus 100 and the transmission apparatus 400 conform to the CEC standard. Hereinafter, the control command conforming to the CEC standard is referred to as a "CEC command."

In the first exemplary embodiment, an example of the communication apparatus 100 is a digital video camera (hereinafter, referred to as a "video camera"). The communication apparatus 100 can be any other apparatus, such as a digital still camera, a digital single-lens reflex camera, and a recorder, which can transmit video data, audio data, and auxiliary data to the external apparatus 200 via the connection cable 300.

In the first exemplary embodiment, an example of the external apparatus 200 is a television receiver (hereinafter, referred to as a "television"). The external apparatus 200 can be any other apparatus, such as a projector, a personal computer, and an audio and visual (AV) amplifier, which can receive video data and audio data from the communication apparatus 100 or the transmission apparatus 400.

In the first exemplary embodiment, an example of the transmission apparatus 400 is a hard disk drive (hereinafter, referred to as a "HDD"). The transmission apparatus 400 can be any other apparatus, such as a digital versatile disk (DVD) player and a recorder, which can transmit video data and audio data to the external apparatus 200 via the connection cable 500.

In the first exemplary embodiment, an example of the connection cable 300 is an "HDMI cable 300" and an example of the connection cable 500 is an "HDMI cable 500."

The HDMI standard in the first exemplary embodiment can be Version 1.2a, Version 1.3a, or any succeeding standard.

The HDMI cable 300 is described below with reference to FIG. 2.

The HDMI cable 300 includes a power line, a Hot Plug Detect (HPD) line 301, and a Display Data Channel (DDC) line 302. The HDMI cable 300 further includes a Transition Minimized Differential Signaling (TMDS) line 303 and a CEC line 304.

The power line can supply +5V power of from the video camera 100 to the television 200.

The HPD line 301 can transmit a high-voltage level (hereinafter, referred to as an "H" level) or a low-voltage level (hereinafter, referred to as an "L" level) HPD signal from the television 200 to the video camera 100.

The DDC line 302 can transmit device information about the television 200 from the television 200 to the video camera 100. The device information about the television 200 is Extended display identification data (EDID) or Enhanced EDID (E-EDID) of the television 200. Each of the EDID and the E-EDID includes, as device information about the television 200, identification information about the television 200 and information relating to the image display ability of the television 200.

For example, the EDID and the E-EDID include support information about the television 200, such as resolution, scanning frequency, an aspect ratio, and a color space. The E-EDID (i.e., the Enhanced EDID) includes a great amount of ability information compared to the EDID. For example, the E-EDID includes support information relating to the format of video data and audio data that are supported by the television 200. Hereinafter, each of the EDID and the E-EDID is simply referred to as an "EDID."

When the video camera 100 receives the EDID from the television 200, the video camera 100 automatically detects the image display ability and the audio processing ability of the television 200 by analyzing the received EDID. Further, the video camera 100 can automatically identify a video format and an audio format that are suitable for the image display ability and the audio processing ability of the television 200. When settings of the video camera 100 are adjusted so as to be suitable for the television 200, the video camera 100 can transmit video data and audio data having been converted into appropriate formats to the television 200.

The TMDS line 303 can transmit video data, audio data, and auxiliary data from the video camera 100 to the television 200. The TMDS line 303 includes a TMDS channel 0, a TMDS channel 1, a TMDS channel 2, and a TMDS clock channel.

The CEC line 304 can transmit CEC commands bidirectionally between the video camera 100 and the television 200.

Next, the HDMI cable 500 is described below with reference to FIG. 2. The HDMI cable 500 has a configuration similar to that of the HDMI cable 300 although not described below in detail.

The HDMI cable 500 includes a power line, an HPD line 501, a DDC line 502, a TMDS line 503, and a CEC line 504.

The power line can supply +5V power from the HDD 400 to the television 200.

The HPD line 501 can transmit an "H" level or an "L" level HPD signal from the television 200 to the HDD 400.

The DDC line 502 can transmit the EDID of the television 200 from the television 200 to the HDD 400.

The TMDS line 503 can transmit video data, audio data, and auxiliary data from the HDD 400 to the television 200.

The CEC line 504 can transmit CEC commands bidirectionally between the HDD 400 and the television 200.

Next, an example configuration of the television 200 is described below with reference to FIG. 2.

The television 200, as illustrated in FIG. 2, includes a central processing unit (CPU) 201, a tuner unit 202, a communication unit 203, a display unit 204, an operation unit 205, a memory 206, a power supply unit 207, and a remote control signal reception unit 208. Further, the television 200 includes a remote control 209.

The CPU 201 controls entire operations to be performed by the television 200 according to a computer program stored in the memory 206. Further, the CPU 201 generates a CEC command for controlling the video camera 100 or the HDD 400 according to a signal input via the operation unit 205. Further, the CPU 201 generates a CEC command for controlling the video camera 100 or the HDD 400 according to a signal input from the remote control signal reception unit 208.

The tuner unit 202 receives a television broadcasting program via a television channel selected by a user.

The communication unit 203 includes an HDMI terminal 203a, an HDMI terminal 203b, a first EDID memory 203c, and a second EDID memory 203d.

The HDMI terminal 203a is a terminal to which the HDMI cable 300 can be connected.

The HDMI terminal 203b is a terminal to which the HDMI cable 500 can be connected.

The first EDID memory 203c stores EDID of the television 200 corresponding to the HDMI terminal 203a. Hereinafter, the EDID of the television 200 corresponding to the HDMI terminal 203a is referred to as a "first EDID." The first EDID includes identification information about the television 200, information relating to the image display ability of the television 200, information relating to the audio processing ability of the television 200, a physical address required to identify the HDMI terminal 203a, and the like. The physical address included in the first EDID is information usable to discriminate the HDMI terminal 203a from other HDMI terminals in the communication system according to the first exemplary embodiment. In the first exemplary embodiment, the description is made on the assumption that the physical address included in the first EDID is "1.0.0.0."

If the operation unit 205 is operated by a user and the information included in the first EDID is changed, the CPU 201 rewrites the information relating to the image display ability of the television 200 and the information relating to the audio processing ability of the television 200. After the information included in the first EDID is rewritten, the CPU 201 stores the rewritten information in the first EDID memory 203c and updates the information included in the first EDID stored in the first EDID memory 203c.

The second EDID memory 203d stores EDID of the television 200 corresponding to the HDMI terminal 203b. Hereinafter, the EDID of the television 200 corresponding to the HDMI terminal 203b is referred to as a "second EDID." The second EDID includes identification information about the television 200, information relating to the image display ability of the television 200, information relating to the audio processing ability of the television 200, a physical address of required to identify the HDMI terminal 203b, and the like. The physical address included in the second EDID is information usable to discriminate the HDMI terminal 203b from other HDMI terminals in the communication system according to the first exemplary embodiment. In the first exemplary embodiment, the description is made on the assumption that the physical address included in the second EDID is "2.0.0.0."

If the operation unit 205 is operated by a user and the information included in the second EDID is changed, the CPU 201 rewrites the information relating to the image display ability of the television 200 and the information relating to the audio processing ability the television 200 included in the second EDID. After the information included in the second EDID is rewritten, the CPU 201 stores the rewritten information in the second EDID memory 203d and updates the information included in the second EDID stored in the second EDID memory 203d.

The communication unit 203 receives video data, audio data, and auxiliary data transmitted from the video camera 100 via the TMDS line 303 and the HDMI terminal 203a. Further, the communication unit 203 receives video data, audio data, and auxiliary data transmitted from the HDD 400 via the TMDS line 503 and the HDMI terminal 203b.

The communication unit 203 receives a CEC command transmitted from the video camera 100 via the CEC line 304 and the HDMI terminal 203a. Further, the communication unit 203 transmits a CEC command, which is generated by the CPU 201 to control the video camera 100, to the video camera 100 via the CEC line 304 and the HDMI terminal 203a.

Further, the communication unit 203 receives a CEC command transmitted from the HDD 400 via the CEC line 504 and the HDMI terminal 203b. Furthermore, the communication unit 203 transmits a CEC command, which is generated by the CPU 201 to control the HDD 400, to the HDD 400 via the CEC line 504 and the HDMI terminal 203b.

If a CEC command is received from the video camera 100 or the HDD 400, the communication unit 203 supplies the received CEC command to the CPU 201. The CPU 201 controls the television 200 according to the CEC command supplied from the communication unit 203 that is received from the video camera 100 or the HDD 400.

When the CPU 201 generates a CEC command serving as a broadcast message defined according to the CEC standard, the CPU 201 controls the communication unit 203 so as to transmit the CEC command (i.e., the broadcast message) to the video camera 100 and the HDD 400.

Further, if a CEC command transmitted from the video camera 100 to the communication unit 203 is a broadcast message, the CPU 201 controls the communication unit 203 to transmit the CEC command received from the video camera 100 to the HDD 400. Furthermore, if a CEC command transmitted from the HDD 400 to the communication unit 203 is a broadcast message, the CPU 201 controls the communication unit 203 to transmit the CEC command received from the HDD 400 to the video camera 100. The broadcast message is a CEC command defined according to the CEC standard so as to be transmitted to all apparatuses that are present in the communication system and conform to the HDMI standard.

The communication unit 203 determines whether the video camera 100 is supplying +5V power to the television 200 via the power line and the HDMI terminal 203a. If it is determines that the +5V power is supplied from the video camera 100 to the television 200 via the power line and the HDMI terminal 203a, the communication unit 203 determines whether the first EDID can be transmitted to the video camera 100.

If it is determined that the first EDID can be transmitted to the video camera 100, the communication unit 203 transmits an "H" level HPD signal to the video camera 100 via the HPD line 301 and the HDMI terminal 203a. Further, if the electric +5V power is not supplied from the video camera 100 to the television 200, the communication unit 203 transmits an "L" level HPD signal to the video camera 100 via the HPD line 301 and the HDMI terminal 203a. Furthermore, in the case where the CPU 201 is rewriting the information included in the first EDID, the communication unit 203 transmits an "L" level HPD signal to the video camera 100 via the HPD line 301 and the HDMI terminal 203a.

The communication unit 203 determines whether the HDD 400 is supplying the +5V power to the television 200 via the power line and the HDMI terminal 203b. If it is determined that the HDD 400 is supplying the +5V power to the television 200 via the power line and the HDMI terminal 203b, the communication unit 203 determines whether the second EDID can be transmitted to the HDD 400. If it is determined that the second EDID can be transmitted to the HDD 400, the communication unit 203 transmits an "H" level HPD signal to the HDD 400 via the HPD line 501 and the HDMI terminal 203b.

Further, if it is determined that the HDD 400 is not supplying the +5V power to the television 200, the communication unit 203 transmits an "L" level HPD signal to the HDD 400 via the HPD line 501 and via the HDMI terminal 203b. Furthermore, in the case where the CPU 201 is rewriting the information included in the second EDID, the communication unit 203 transmits an "L" level HPD signal to the HDD 400 via the HPD line 501 and the HDMI terminal 203b.

The communication unit 203 reads the first EDID from the first EDID memory 203c in response to a request from the video camera 100 and transmits the first EDID to the video camera 100 via the DDC line 302 and the HDMI terminal 203a. Further, the communication unit 203 reads the second EDID from the second EDID memory 203d in response to a request from the HDD 400 and transmits the second EDID to the HDD 400 via the DDC line 502 and the HDMI terminal 203b.

The display unit 204 can be constituted by a liquid crystal display device or a comparable display device. When the tuner unit 202 receives a television broadcasting program, when the communication unit 203 receives video data from the video camera 100, and when the communication unit 203 receives video data from the HDD 400, the display unit 204 displays at least one of these video data supplied to the display unit 204.

The operation unit 205 provides a user interface that enables a user to operate the television 200. If the operation unit 205 is operated by a user, the CPU 201 receives an input signal corresponding to a user's instruction input via the operation unit 205 from the operation unit 205. The CPU 201 controls the television 200 according to the input signal. Further, the operation unit 205 includes a plurality of buttons that enable the user to operate the television 200. The buttons of the operation unit 205 can be configured by switches and a touch panel. The operation unit 205 further includes a power button and an external input button that enable the user to operate the television 200.

The power button is operable to instruct the CPU 201 to bring the television 200 into any one of a power on (ON) state, a standby state, and a power off (OFF) state. When the television 200 is in the power on state, the CPU 201 controls the power supply unit 207 to supply sufficient electric power required for the entire operation of the television 200. When the television 200 is in the standby state, the CPU 201 controls the power supply unit 207 to supply electric power to a limited part of the television 200. Further, when the television 200 is in the power off state, the CPU 201 controls the power supply unit 207 to stop electric power supply to the television 200.

The external input button is operable to instruct whether to display the video data received via the HDMI terminal 203*a* on the display unit 204 or display the video data received via the HDMI terminal 203*b* on the display unit 204.

If the selection by the external input button is displaying the video data received via the HDMI terminal 203*a* on the display unit 204, the CPU 201 selects the HDMI terminal 203*a*. In this case, the CPU 201 controls the communication unit 203 to supply the video data received by the communication unit 203 via the HDMI terminal 203*a* to the display unit 204 and to supply the audio data received by the communication unit 203 via the HDMI terminal 203*a* to a speaker unit (not illustrated). The CPU 201 further controls the communication unit 203 to supply the auxiliary data received by the communication unit 203 via the HDMI terminal 203*a* to the CPU 201.

Thus, when the CPU 201 selects the HDMI terminal 203*a*, the display unit 204 displays the video data that the communication unit 203 has received via the HDMI terminal 203*a* and the speaker unit outputs the audio data that the communication unit 203 has received via the HDMI terminal 203*a*. Further, when the CPU 201 selects the HDMI terminal 203*a*, the CPU 201 sets the video camera 100 connected via the HDMI terminal 203*a* as an operational target to be remotely controlled by the remote control 209.

If the selection by the external input button is displaying the video data received via the HDMI terminal 203*b* on the display unit 204, the CPU 201 selects the HDMI terminal 203*b*. In this case, the CPU 201 controls the communication unit 203 to supply the video data received by the communication unit 203 via the HDMI terminal 203*b* to the display unit 204 and to supply the audio data received by the communication unit 203 via the HDMI terminal 203*b* to the speaker unit (not illustrated). The CPU 201 further controls the communication unit 203 to supply the auxiliary data received by the communication unit 203 via the HDMI terminal 203*b* to the CPU 201.

Thus, when the CPU 201 selects the HDMI terminal 203*b*, the display unit 204 displays the video data that the communication unit 203 has received via the HDMI terminal 203*b* and the speaker unit outputs the audio data that the communication unit 203 has received via the HDMI terminal 203*b*. Further, when the CPU 201 selects the HDMI terminal 203*b*, the CPU 201 sets the HDD 400 connected via the HDMI terminal 203*b* as an operational target to be remotely controlled by the remote control 209.

The power supply unit 207 supplies electric power from an alternate current (AC) power source (not illustrated) to respective constituent components of the television 200.

If the remote control signal reception unit 208 receives a remote control signal from the remote control 209, the remote control signal reception unit 208 supplies the received remote control signal as an input signal to the CPU 201. Thus, a user's instruction can be input as an input signal to the CPU 201 via the remote control 209 and the remote control signal reception unit 208. The CPU 201 can generate a CEC command that corresponds to the remote control signal supplied from the remote control signal reception unit 208 and can supply the generated CEC command to the communication unit 203.

In this case, if the CPU 201 selects the HDMI terminal 203*a*, the CEC command supplied to the communication unit 203 is transmitted to the video camera 100 via the CEC line 304 and the HDMI terminal 203*a*. Further, if the CPU 201 selects the HDMI terminal 203*b*, the CEC command supplied to the communication unit 203 is transmitted to the HDD 400 via the CEC line 504 and the HDMI terminal 203*b*.

The remote control 209 provides a user interface that enables a user to operate the television 200, the video camera 100, and the HDD 400. Further, the remote control 209 includes a plurality of buttons that enable the user to operate the video camera 100, a plurality of buttons that enable the user to operate the television 200, and a plurality of buttons that enable the user to operate the HDD 400. The buttons of the remote control 209 can be configured by switches and a touch panel.

Further, the remote control 209 can perform wireless communication with the television 200. However, the remote control 209 is configured not to be able to perform wireless communication with the video camera 100 and the HDD 400.

Therefore, the user can directly control the television 200 with the remote control 209. Further, the user can indirectly control the video camera 100 and the HDD 400 with the remote control 209.

If a user's input via the external input button is selecting the display of the video data received via the HDMI terminal 203*a* on the display unit 204, the user can realize a remote control of the video camera 100 based on the CEC command with the remote control 209. However, in this case, the user cannot remotely control the HDD 400 based on the CEC command with the remote control 209.

Further, if a user's input via the external input button is selecting the display of the video data received via the HDMI terminal 203*b* on the display unit 204, the user can realize a remote control of the HDD 400 based on the CEC command with the remote control 209. However, in this case, the user cannot remotely control the video camera 100 based on the CEC command with the remote control 209.

The HDMI terminals included in the communication unit 203 are not limited to the HDMI terminal 203*a* and the HDMI terminal 203*b*. The communication unit 203 may include three or more HDMI terminals. Further, the physical address of the HDMI terminal 203*a* is not limited to "1.0.0.0." The physical address of the HDMI terminal 203*b* is also not limited to "2.0.0.0."

Next, an example configuration of the video camera 100 is described below with reference to FIG. 2.

The video camera 100, as illustrated in FIG. 2, includes a CPU 101, a memory 102, a communication unit 103, an image capture unit 104, a recording unit 105, a display unit 106, an operation unit 107, and a power supply unit 108. Hereinafter, the video camera 100 is described below in more detail.

The CPU 101 controls entire operations to be performed by the video camera 100 according to a computer program stored in the memory 102. The CPU 101 can detect the image display ability and the audio processing ability of the television 200 by analyzing the EDID of the television 200 acquired from the television 200. Further, the CPU 101 can generate video data and audio data suitable for the television 200 based on the image display ability and the audio processing ability of the television 200. The CPU 101 controls entire operations to be performed by the video camera 100 by analyzing data supplied from each component of the video camera 100. Further, the CPU 101 generates a CEC command, in response to a signal input via the operation unit 107, for controlling the television 200 or the HDD 400.

The memory 102 is functionally operable as a work area of the CPU 101. Further, a flag setting corresponding to an operation of each component can be stored in the memory 102. Information acquired from the television 200 and information relating to the video camera 100 can be also stored in the memory 102.

Further, the memory 102 stores results of calculation and analysis performed by the CPU 101. The work area of the CPU 101 is not limited to the memory 102 and can be a hard disk apparatus or any other external storage apparatus.

The communication unit 103 includes an HDMI terminal to which the HDMI cable 300 can be connected. Further, the communication unit 103 can transmit and receive CEC commands via the HDMI terminal and can transmit video data, audio data, and auxiliary data. The communication unit 103 includes a first connection detection unit 103a, a second connection detection unit 103b, a device information acquisition unit 103c, a data transmission unit 103d, and a command processing unit 103e.

The first connection detection unit 103a can receive an HPD signal transmitted from the television 200 via the HPD line 301. When the first connection detection unit 103a has received an "H" level HPD signal via the HPD line 301, the first connection detection unit 103a notifies the CPU 101 of the reception of the "H" level HPD signal.

Similarly, when the first connection detection unit 103a has received an "L" level HPD signal via the HPD line 301, the first connection detection unit 103a notifies the CPU 101 of the reception of the "L" level HPD signal. Further, when the HPD signal has changed from "H" level to "L" level, or when the HPD signal has changed from "L" level to "H" level, the first connection detection unit 103a notifies the CPU 101 of the change in the HPD signal.

To detect the presence of the television 200, the second connection detection unit 103b can continuously detect whether the TMDS line 303 is connected to a terminal resistor on the television 200 side.

For example, information generally referred to as "Receiver Sense (hereinafter referred to as a 'Rx sense')" can be used to detect whether the TMDS line 303 is connected to the terminal resistor of the television 200. The Rx sense includes an "H" level Rx sense indicating that the TMDS line 303 is connected to the terminal resistor of the television 200 and an "L" level Rx sense indicating that the TMDS line 303 is not connected to the terminal resistor of the television 200.

When the TMDS line 303 is connected to the terminal resistor of the television 200, the second connection detection unit 103b detects the "H" level Rx sense. Further, when the TMDS line 303 is not connected to the terminal resistor of the television 200, the second connection detection unit 103b detects the "L" level Rx sense.

The situation that the TMDS line 303 is connected to the terminal resistor of the television 200 is a state where the television 200 is in the power on state and the television 200 can display video data received from the HDMI terminal 203a corresponding to the HDMI terminal of the video camera 100. When the "H" level Rx sense is detected by the second connection detection unit 103b, the television 200 receives the video data transmitted from the data transmission unit 103d via the HDMI cable 300 and the HDMI terminal 203a, and displays the video data transmitted from the data transmission unit 103d.

The situation that the TMDS line 303 is not connected to the terminal resistor of the television 200 is a state where the television 200 is in the power off state. Further, the situation that the TMDS line 303 is not connected to the terminal resistor of the television 200 is a state where the television 200 can display video data other than the video data received via the TMDS line 303 and the HDMI terminal 203a corresponding to the HDMI terminal of the video camera 100.

The second connection detection unit 103b notifies the CPU 101 of the current level ("H" level or "L" level) of the detected Rx sense. Further, when the Rx sense has changed from "H" level to "L" level, or when the Rx sense has changed from "L" level to "H" level, the second connection detection unit 103b notifies the CPU 101 of the change in the Rx sense.

When the "H" level HPD signal is detected by the first connection detection unit 103a, the device information acquisition unit 103c requests the television 200 to transmit the EDID of the television 200 via the DDC line 302. In this case, the device information acquisition unit 103c acquires the first EDID transmitted from the television 200 via the DDC line 302.

When the device information acquisition unit 103c has received the first EDID from the television 200 via the DDC line 302, the device information acquisition unit 103c determines that the first EDID has been received from the television 200 and notifies the CPU 101 of the reception of the first EDID. The first EDID received from the television 200 is supplied to the CPU 101 via the device information acquisition unit 103c. The CPU 101 stores the first EDID supplied from the device information acquisition unit 103c in the memory 102.

Further, when the "L" level HPD signal is detected by the first connection detection unit 103a, the device information acquisition unit 103c does not request the television 200 to transmit the EDID of the television 200 via the DDC line 302.

The data transmission unit 103d transmits video data suitable for the image display ability of the television 200, audio data suitable for the audio processing ability of the television 200, and auxiliary data to the television 200 via the TMDS line 303.

When the HPD signal detected by the first connection detection unit 103a is an "H" level HPD signal and the Rx sense detected by the second connection detection unit 103b is an "H" level Rx sense, the data transmission unit 103d is brought into a state that the data transmission unit 103d can transmit the video data and audio data generated by the CPU 101 to the television 200. In this case, the video camera 100 is brought into a state that the video camera 100 can transmit the video data and audio data generated by the CPU 101 according to the first EDID to the television 200 via the TMDS line 303. Hereinafter, the state where the HPD signal detected by the first connection detection unit 103a and the Rx sense detected by the second connection detection unit 103b are both "H" level is referred to as an "active state."

When the HPD signal detected by the first connection detection unit 103a is an "L" level HPD signal, the data transmission unit 103d cannot transmit the video data and audio data generated by the CPU 101 to the television 200. Further, when the Rx sense detected by the second connection detection unit 103b is an "L" level Rx sense, the data transmission unit 103d cannot transmit the video data and audio data generated by the CPU 101 to the television 200. When the data transmission unit 103d cannot transmit the video data and audio data generated by the CPU 101 to the television 200, the video camera 100 cannot be brought into the active state.

When an operation mode of the video camera 100 is a image capture mode, the data transmission unit 103d transmits video data generated by the image capture unit 104 and audio data generated by a microphone unit (not illustrated) to the television 200 via the TMDS line 303. In this case, the data transmission unit 103d transmits auxiliary data generated by the CPU 101 together with the video data and audio data to the television 200 via the TMDS line 303.

When the operation mode of the video camera 100 is a playback mode, the data transmission unit 103d transmits video data and audio data reproduced by a storage medium 105a from the recording unit 105 to the television 200 via the TMDS line 303. In this case, the data transmission unit 103d transmits auxiliary data generated by the CPU 101 together with the video data and audio data to the television 200 via the TMDS line 303.

The command processing unit 103e receives a CEC command transmitted from the television 200 via the CEC line 304. The CEC command received from the television 200 is supplied from the command processing unit 103e to the CPU 101. The CPU 101 controls the video camera 100 according to the CEC command received from the television 200.

Further, the command processing unit 103e transmits a CEC command for controlling the television 200 or the HDD 400 to the television 200 via the CEC line 304. The CEC command for controlling the television 200 or the HDD 400 is generated by the CPU 101 and supplied from the CPU 101 to the command processing unit 103e.

When the video camera 100 transmits a CEC command to the television 200, if the television 200 has successfully received the CEC command from the video camera 100, the television 200 transmits an answer signal responding to the received CEC command to the video camera 100. Therefore, the command processing unit 103e can receive the answer signal responding to the CEC command from the television 200. The answer signal responding to the CEC command includes an Acknowledge (ACK) signal that indicates an affirmative response and a Negative Acknowledge (NACK) signal that indicates a denial response.

When the operation mode of the video camera 100 is the image capture mode, the image capture unit 104 captures an image of a photographing subject and generates video data based on an optical image of the subject. The video data generated by the image capture unit 104 can be any data, such as moving image data and still image data. The video data generated by the image capture unit 104 is supplied from the image capture unit 104 to the data transmission unit 103d, the recording unit 105, and the display unit 106.

If the first EDID is received from the television 200, the image capture unit 104 converts the video data to be supplied from the image capture unit 104 to the data transmission unit 103d into video data suitable for the image display ability of the television 200. When the video data is supplied from the image capture unit 104 to the communication unit 103, the communication unit 103 transmits the received video data to the television 200 via the TMDS line 303. When the video data is supplied from the image capture unit 104 to the recording unit 105, the received video data is recorded on the storage medium 105a. When the video data is supplied from the image capture unit 104 to the display unit 106, the received video data is displayed on the display unit 106.

When the image capture unit 104 generates video data, the microphone unit (not illustrated) generates audio data. The audio data generated by the microphone unit is supplied from the microphone unit to the data transmission unit 103d, the recording unit 105, and the speaker unit (not illustrated).

If the first EDID is received from the television 200, the microphone unit converts the audio data to be supplied from the microphone unit to the data transmission unit 103d into audio data suitable for the audio processing ability of the television 200. When the audio data is supplied from the microphone unit to the data transmission unit 103d, the data transmission unit 103d transmits the received audio data to the television 200 via the TMDS line 303. When the audio data is supplied from the microphone unit to the recording unit 105, the received audio data is recorded on the storage medium 105a. When the audio data is supplied from the microphone unit to the display unit 106, the received audio data is output from the speaker unit.

When the operation mode of the video camera 100 is the playback mode, the image capture unit 104 stops capturing an image of the photographing subject and stops generating video data based on the optical image of the subject.

When the operation mode of the video camera 100 is the shooting mode, the recording unit 105 can record the video data generated by the image capture unit 104 and the audio data generated by the microphone unit on the storage medium 105a. The recording of the video data generated by the image capture unit 104 and the audio data generated by the microphone unit on the storage medium 105a can be controlled by the CPU 101 according to a user's instruction input via the operation unit 107. Alternatively, the recording of the video data generated by the image capture unit 104 and the audio data generated by the microphone unit on the storage medium 105a can be controlled by the CPU 101 according to a CEC command received from the television 200.

When the operation mode of the video camera 100 is the playback mode, the recording unit 105 can reproduce the video data and the audio data from the storage medium 105a according to a selection by a user. The selection of the video data and audio data to be reproduced from the storage medium 105a can be controlled by the CPU 101 according to a user's instruction input via the operation unit 107. Alternatively, the selection of the video data and audio data to be reproduced from the storage medium 105a can be controlled by the CPU 101 according to the CEC command received from the television 200.

When the recording unit 105 reproduces the video data from the storage medium 105a, the reproduced video data is supplied from the recording unit 105 to each of the data transmission unit 103d and the display unit 106. If the first EDID is successively received from the television 200, the recording unit 105 converts the video data supplied to the data transmission unit 103d into video data suitable for the image display ability of the television 200 according to the first EDID. The video data supplied from the recording unit 105 to the data transmission unit 103d is transmitted to the television 200 via the TMDS line 303. The video data supplied from the recording unit 105 to the display unit 106 is displayed on the display unit 106.

When the recording unit 105 reproduces the audio data from the storage medium 105a, the reproduced audio data is supplied from the recording unit 105 to each of the data transmission unit 103d and the speaker unit (not illustrated). If the first EDID is successively received from the television 200, the recording unit 105 converts the audio data supplied to the data transmission unit 103d into audio data suitable for the audio processing ability of the television 200 according to the first EDID. The audio data supplied from the recording unit 105 to the data transmission unit 103d is transmitted to the television 200 via the TMDS line 303. The audio data supplied from the recording unit 105 to the speaker unit is output from the speaker unit.

The storage medium 105a may be, for example, a memory card or a secure digital (SD) card. The storage medium 105a can be a storage medium provided in the video camera 100 or a storage medium removable from the video camera 100.

The display unit 106 can be constituted by a liquid crystal display device or a comparable display device. When the operation mode of the video camera 100 is the shooting mode, the video data generated by the image capture unit 104 is displayed on the display unit 106. When the operation mode of the video camera 100 is the playback mode, the display unit 106 displays the video data reproduced from the storage medium 105a by the recording unit 105.

The operation unit 107 provides a user interface that enables a user to operate the video camera 100. The operation unit 107 includes a plurality of buttons that enable the user to operate the video camera 100. The buttons of the operation unit 107 can be configured by switches and a touch panel. The CPU 101 can control the video camera 100 according to an input signal corresponding to a user's instruction input via the operation unit 107.

Next, an example configuration of the HDD 400 is described below with reference to FIG. 2.

The HDD 400, as illustrated in FIG. 2, includes a CPU 401, a memory 402, a communication unit 403, a storage medium 404, a recording unit 405, a display unit 406, and an operation unit 407. Hereinafter, the HDD 400 is described in more detail.

The CPU 401 controls entire operations to be performed by the HDD 400 according to a computer program stored in the memory 402. Further, the CPU 401 generates a CEC command for controlling the television 200 or the video camera 100 according to a signal input from the operation unit 407.

The memory 402 is functionally operable as a work area of the CPU 401.

The communication unit 403 includes an HDMI terminal to which the HDMI cable 500 can be connected. The communication unit 403 acquires the second EDID via the HDMI terminal. Further, the communication unit 403 receives a CEC command from the television 200 via the CEC line 504 and transmits a CEC command to the television 200 via the CEC line 504. Furthermore, the communication unit 403 transmits video data, audio data, and auxiliary data. The communication unit 403 includes a connection detection unit 403a, a device information acquisition unit 403b, a data transmission unit 403c, and a command processing unit 403d.

The connection detection unit 403a receives an HPD signal transmitted from the television 200 via the HPD line 501.

When the connection detection unit 403a detects an "H" level HPD signal, the device information acquisition unit 403b requests the television 200, via the DDC line 502, to transmit the EDID of the television 200 and acquires the second EDID from the television 200. When the device information acquisition unit 403b has received the second EDID, the device information acquisition unit 403b supplies the second EDID to the CPU 401. The CPU 401 analyzes the second EDID and acquires the physical address "2.0.0.0" as a result of analysis on the second EDID, and stores the acquired physical address as a "physical address of the HDD 400" in the memory 402.

The data transmission unit 403c transmits video data, audio data, and auxiliary data generated according to the second EDID to the television 200 via the TMDS line 503.

The command processing unit 403d receives a CEC command transmitted from the television 200 via the CEC line 504 and transmits a CEC command for controlling the television 200 or the video camera 100 to the television 200 via the CEC line 504.

The storage medium 404 stores video data and audio data. The storage medium 404 may be provided in the HDD 400 or removable from the HDD 400.

The recording unit 405 reads the video data and the audio data from the storage medium 404 according to a selection by a user and reproduces the read video data and audio data. The selection of the video data and audio data to be reproduced from the storage medium 404 can be controlled by the CPU 401 according to a user's instruction input via the operation unit 407.

When the recording unit 405 reproduces the video data from the storage medium 404, the reproduced video data is supplied from the recording unit 405 to the data transmission unit 403c. If the second EDID is received from the television 200, the recording unit 405 converts the video data to be supplied to the data transmission unit 403c into video data suitable for the display format of the television 200 according to the second EDID. The video data supplied from the recording unit 105 to the data transmission unit 403c is transmitted to the television 200 via the TMDS line 503.

The display unit 406 can be constituted by a liquid crystal display device or a comparable display device. The display unit 406 displays text information representing an operational state of the HDD 400.

The operation unit 407 provides a user interface that enables a user to operate the HDD 400. The operation unit 107 includes a plurality of buttons that enable the user to operate the HDD 400. The CPU 401 controls the HDD 400 according to an input signal corresponding to a user's instruction input via the operation unit 407.

Next, a first physical address acquisition process that can be performed by the video camera 100 according to the first exemplary embodiment is described below with reference to FIG. 3.

Figure 3:
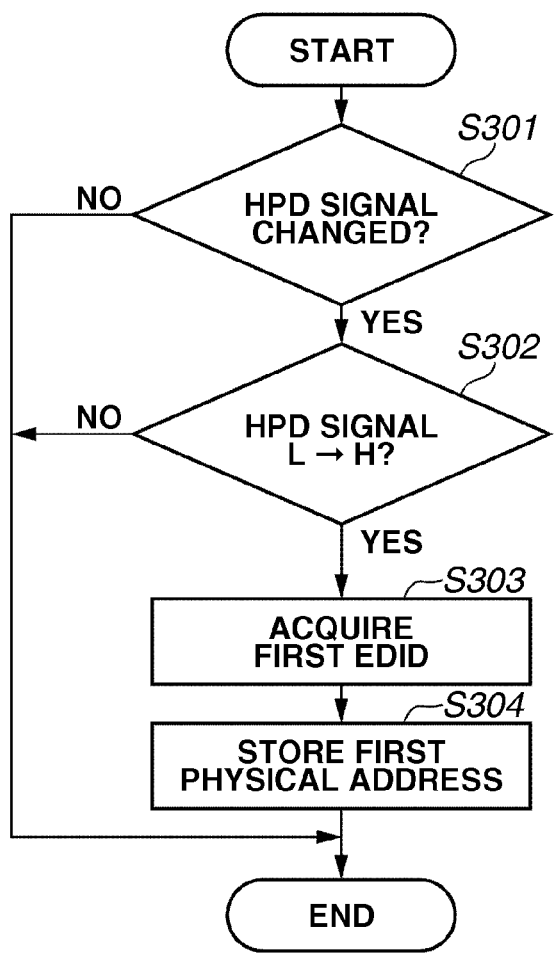
FIG. 3 is a flowchart illustrating an example of a first physical address acquisition process that can be performed by the communication apparatus according to the first exemplary embodiment of the present invention.

FIG. 3 is a flowchart illustrating an example of the first physical address acquisition process that can be performed by the video camera 100 according to the first exemplary embodiment.

In the first exemplary embodiment, the description will be made of a case where the CPU 101 of the video camera 100 performs the first physical address acquisition process when the video camera 100 is supplying +5V power to the television 200 via the power line. Further, in the first exemplary embodiment, the CPU 101 controls the first physical address acquisition process according to a computer program stored in the memory 102.

In step S301, the CPU 101 determines whether there is any change in the HPD signal detected by the first connection detection unit 103a. If it is determined that the HPD signal has not changed (NO in step S301), the CPU 101 terminates the process of the flowchart illustrated in FIG. 3. If it is determined that the HPD signal has changed (YES in step S301), the CPU 101 further determines whether the HPD signal has changed from "L" level to "H" level to acquire the first EDID from the television 200. Hence, if the determination result is YES in step S301, the process of the flowchart proceeds from step S301 to step S302.

In step S302, the CPU 101 determines whether the HPD signal detected by the first connection detection unit 103a has changed from "L" level to "H" level. If it is determined that the HPD signal has changed from "H" level to "L" level (NO in step S302), the CPU 101 determines that the video camera 100 cannot acquire the first EDID from the television 200. In this case (NO in step S302), the CPU 101 terminates the process of the flowchart illustrated in FIG. 3.

If it is determined that the HPD signal has changed from "L" level to "H" level (YES in step S302), the CPU 101 determines that the video camera 100 can acquire the first EDID from the television 200. In this case (YES in step S302), the CPU 101 acquires the first EDID from the television 200 to generate video data suitable for the image display ability of the television 200. Hence, if the determination result is YES in step S302, the process of the flowchart proceeds from step S302 to step S303.

In step S303, the device information acquisition unit 103c requests the television 200 to transmit the EDID of the television 200 via the DDC line 302. When the first EDID is transmitted from the television 200 to the video camera 100 via the DDC line 302, the device information acquisition unit 103c receives the first EDID via the DDC line 302.

The device information acquisition unit 103c notifies the CPU 101 of the reception of the first EDID and supplies the received first EDID to the CPU 101. After the CPU 101 stores the first EDID supplied from the device information acquisition unit 103c into the memory 102, the process of the flowchart proceeds from step S303 to step S304.

In step S304, the CPU 101 analyzes the first EDID stored in the memory 102. The CPU 101 acquires information included in the first EDID obtained by analysis on the first EDID, such as a physical address, identification information about the television 200, information relating to the image display ability, and information relating to the audio processing ability.

Hereinafter, the physical address included in the first EDID of the television 200, which is acquired from the television 200 by the device information acquisition unit 103c, is referred to as a "first physical address." The CPU 101 stores the first physical address "1.0.0.0" obtained by analysis on the first EDID as a "physical address of the video camera 100" in the memory 102.

The physical address of the video camera 100 is information usable to identify whether the HDMI terminal of the video camera 100 corresponds to any one of the HDMI terminal 203a and the HDMI terminal 203b of the television 200. The television 200 can determine whether the video camera 100 corresponds to any one of the HDMI terminal 203a and the HDMI terminal 203b by referring to the physical address of the video camera 100 notified by the video camera 100 to the television 200. If the CPU 101 completes the storage of the first physical address (i.e., the physical address of the video camera 100) in the memory 102, the CPU 101 terminates the process of the flowchart illustrated in FIG. 3.

Next, a second physical address acquisition process that can be performed by the video camera 100 according to the first exemplary embodiment is described below with reference to FIG. 4.

FIG. 4 is a flowchart illustrating an example of the second physical address acquisition process that can be performed by the video camera 100 according to the first exemplary embodiment.

In the first exemplary embodiment, the description will be made of a case where the CPU 101 of the video camera 100 performs the second physical address acquisition process when the video camera 100 is supplying +5V power to the television 200 via the power line. Further, in the first exemplary embodiment, the CPU 101 controls the second physical address acquisition process according to a computer program stored in the memory 102. The second physical address is described below in more detail.

In step S401, the CPU 101 generates a <Polling Message> command. The <Polling Message> command is a CEC command usable to confirm whether the television 200 is operable in conformity with the CEC standard. The CPU 101 outputs the generated <Polling Message> command to the command processing unit 103e. The CPU 101 controls the command processing unit 103e to transmit the <Polling Message> command to the television 200 via the CEC line 304. After transmission of the <Polling Message> command from the command processing unit 103e to the television 200 via the CEC line 304 is completed, the process of the flowchart proceeds from step S401 to step S402.

In step S402, the CPU 101 determines whether the command processing unit 103e has received an ACK signal responding to the <Polling Message> command from the television 200.

If it is determined that the ACK signal has not been received (NO in step S402), the CPU 101 determines that the television 200 is not operable in conformity with the CEC standard. Similarly, if it is determined that a NACK signal has not been received, the CPU 101 determines that the television 200 is not operable in conformity with the CEC standard. If the determination result is NO in step S402, the CPU 101 terminates the process of the flowchart illustrated in FIG. 4.

If it is determined that the ACK signal has been received (YES in step S402), the CPU 101 determines that the television 200 is operable in conformity with the CEC standard. In this case (YES in step S402), the CPU 101 controls the command processing unit 103e to transmit the CEC command to the television 200 via the CEC line 304 and receive the CEC command from the television 200 via the CEC line 304. If the determination result is YES in step S402, the process of the flowchart proceeds from step S402 to step S403.

In step S403, the CPU 101 determines whether the command processing unit 103e has received a <Set Stream Path> command from the television 200 via the CEC line 304.

The <Set Stream Path> command is a CEC command indicating that the television 200 selects either the HDMI terminal 203a or the HDMI terminal 203b. Further, the <Set Stream Path> command includes a physical address corresponding to the HDMI terminal 203a or the HDMI terminal 203b, as an operand. Therefore, the television 200 transmits the <Set Stream Path> command to the video camera 100 to notify the video camera 100 of the HDMI terminal 203a or the HDMI terminal 203b to be selected by the television 200.

Further, the <Set Stream Path> command is a CEC command prompting a communication partner to transmit video data and an answering command responding to the <Set Stream Path> command to the television 200. Therefore, the apparatus having a physical address that matches the physical address included in the <Set Stream Path> command operates to transmit the video data and the answering command responding to the <Set Stream Path> command to the television 200. The <Set Stream Path> command is a broadcast message defined according to the CEC standard.

When the television 200 selects the HDMI terminal 203a, the television 200 transmits the <Set Stream Path> command including the physical address "1.0.0.0" corresponding to the HDMI terminal 203a as an operand to the video camera 100 and the HDD 400. When the television 200 selects the HDMI terminal 203b, the television 200 transmits the <Set Stream Path> command including the physical address "2.0.0.0" corresponding to the HDMI terminal 203b as an operand to the video camera 100 and to the HDD 400.

If it is determined that the <Set Stream Path> command has been received (YES in step S403), the CPU 101 acquires the physical address included in the <Set Stream Path> command. Hereinafter, the physical address included in the CEC command transmitted from the television 200 to the command processing unit 103e is referred to as a "second physical address."

If it is determined that the <Set Stream Path> command has not been received (NO in step S403), the process of the flowchart proceeds from step S403 to step S409. If it is determined that the <Set Stream Path> command has been received (YES in step S403), the process of the flowchart proceeds from step S403 to step S404.

In step S404, the CPU 101 analyzes the <Set Stream Path> command received by the command processing unit 103e. The CPU 101 acquires the second physical address as a result of analysis on the <Set Stream Path> command and stores the second physical address in the memory 102. Further, if the second physical address is already stored in the memory 102, the CPU 101 updates the second physical address by overwriting the stored address with the newly acquired address. The CPU 101 stores the first physical address recorded as the physical address of the video camera 100 separately from the second physical address in the memory 102.

The above described separate storage is useful because the CPU 101 can refer to the second physical address when the CPU 101 determines whether to transmit the video data and the answering command responding to the <Set Stream Path> command to the television 200.

When the second physical address is stored in the memory 102, the CPU 101 determines whether to transmit the video data and the answering command responding to the <Set Stream Path> command to the television 200 by comparing the first physical address with the second physical address. Hence, the CPU 101 confirms the presence of the first physical address stored in the memory 102. If the second physical address is stored in the memory 102, the process of the flowchart proceeds from step S404 to step S405.

In step S405, the CPU 101 determines whether the first physical address (i.e., the physical address of the video camera 100) is stored in the memory 102. If it is determined that the first physical address is stored in the memory 102 (YES in step S405), the CPU 101 determines that the first EDID and the first physical address are stored in the memory 102. When the first physical address is stored in the memory 102, the CPU 101 compares the first physical address with the second physical address. Hence, if the determination result is YES in step S405, the process of the flowchart proceeds from step S405 to step S406.

If it is determined that the first physical address is not stored in the memory 102 (NO in step S405), the CPU 101 determines that the first EDID and the first physical address are not stored in the memory 102. In this case, the CPU 101 cannot compare the first physical address with the second physical address before storage of the first physical address (i.e., the physical address of the video camera 100) in the memory 102 is completed. Hence, the CPU 101 waits to transmit the video data and the answering command responding to the <Set Stream Path> command to the television 200 until the first EDID and the first physical address are stored in the memory 102. If the determination result is NO in step S405, the process of the flowchart returns from step S405 to step S405.

In step S406, the CPU 101 determines whether the first physical address "1.0.0.0" stored in the memory 102 matches the second physical address. More specifically, by checking whether the first physical address "1.0.0.0" matches the second physical address, the CPU 101 determines whether the HDMI terminal 203a corresponding to the video camera 100 is selected by the television 200. Further, by checking whether the HDMI terminal 203a corresponding to the video camera 100 is selected by the television 200, the CPU 101 determines whether to transmit the video data and the answering command responding to the <Set Stream Path> command to the television 200.

If it is determined that the first physical address "1.0.0.0" does not match the second physical address (NO in step S406), the CPU 101 determines that the second physical address is the physical address "2.0.0.0" corresponding to the HDMI terminal 203b. Thus, the CPU 101 determines that the terminal selected by the television 200 is the HDMI terminal 203b that does not correspond to the video camera 100, in other words, the television 200 does not select the HDMI terminal 203a corresponding to the video camera 100.

If the determination result is NO in step S406, the television 200 selects the HDMI terminal 203b corresponding to the HDD 400. Therefore, the CPU 101 determines not to transmit the video data and the answering command responding to the <Set Stream Path> command to the television 200.

Hence, if the determination result is NO in step S406, the CPU 101 controls the data transmission unit 103d so as not to transmit the video data to the television 200. Further, if the determination result is NO in step S406, the CPU 101 controls the command processing unit 103e so as not to transmit the answering command responding to the <Set Stream Path> command to the television 200. In this case (NO in step S406), the process of the flowchart proceeds from step S406 to step S409.

If it is determined that the first physical address "1.0.0.0" match the second physical address (YES in step S406), the CPU 101 determines that the second physical address is the physical address "1.0.0.0" corresponding to the HDMI terminal 203a. Accordingly, the CPU 101 determines that the terminal selected by the television 200 is the HDMI terminal 203a corresponding to the video camera 100. If the determination result is YES in step S406, i.e., when the terminal selected by the television 200 is the HDMI terminal 203a corresponding to the video camera 100, the CPU 101 determines to transmit the video data and the answering command responding to the <Set Stream Path> command to the television 200. Hence, if the determination result is YES in step S406, the process of the flowchart proceeds from step S406 to step S407.

In step S407, the CPU 101 generates video data complying with the first EDID stored in the memory 102. The CPU 101 outputs the generated video data to the data transmission unit 103d and controls the data transmission unit 103d to transmit the generated video data to the television 200. In this case, the process of the flowchart proceeds from step S407 to step S408.

In step S408, the CPU 101 generates an answering command responding to the <Set Stream Path> command that has been received by the command processing unit 103e.

The answering command responding to the <Set Stream Path> command generated by the CPU 101 is an <Active Source> command including the first physical address as an operand. The <Active Source> command including the first physical address is a CEC command usable to notify the television 200 that the video camera 100 corresponds to the HDMI terminal 203a identified by the first physical address "1.0.0.0." The <Active Source> command including the first physical address is a broadcast message defined according to the CEC standard.

Further, the CPU 101 supplies the <Active Source> command including the first physical address to the command processing unit 103e. Further, the CPU 101 controls the command processing unit 103e so as to transmit the <Active Source> command including the first physical address to the television 200 and the HDD 400. The <Active Source> command including the first physical address is transmitted to the television 200 and to the HDD 400 when the data transmission unit 103d of the video camera 100 transmits the video data suitable for the image display ability of the television 200 to the television 200.

Therefore, if the television 200 receives the <Active Source> command including the first physical address from the video camera 100, the television 200 recognizes that the video camera 100 is in an active state. Further, the television 200 recognizes that the video camera 100 currently being in the active state corresponds to the HDMI terminal 203*a* selected by the television 200. If the television 200 receives the <Active Source> command including the first physical address from the video camera 100, the television 200 controls the communication unit 203 so as to transmit the received <Active Source> command including the first physical address to the HDD 400.

If the HDD 400 receives the <Active Source> command including the first physical address, the HDD 400 recognizes that the video camera 100 is in the active state and the television 200 displays the video data received from the video camera 100.

If the command processing unit 103*e* completes the transmission of the <Active Source> command including the first physical address to the television 200, the CPU 101 terminates the process of the flowchart illustrated in FIG. 4.

Hereinafter, the <Active Source> command including the first physical address (i.e., the physical address of the video camera 100) is referred to as a "second CEC command."

A <Set Stream Path> command including a physical address that matches the first physical address (i.e., the physical address of the video camera 100) is referred to as a "third CEC command."

A <Set Stream Path> command including a physical address that does not match the first physical address (i.e., the physical address of the video camera 100) is referred to as a "fourth CEC command."

In step S409, the CPU 101 determines whether the command processing unit 103*e* has received the <Active Source> command from the television 200 via the CEC line 304. If it is determined that the <Active Source> command has not been received (NO in step S409), the CPU 101 determines that the television 200 has not received the <Active Source> command including the physical address of the HDD 400 from the HDD 400. If the determination result is NO in step S409, the CPU 201 terminates the process of the flowchart illustrated in FIG. 4.

If it is determined that the <Active Source> command has been received (YES in step S409), the CPU 101 determines that the television 200 has received the <Active Source> command including the physical address of the HDD 400 from the HDD 400. If the determination result is YES in step S409, the process of the flowchart proceeds from step S409 to step S410.

In step S410, the CPU 101 analyzes the <Active Source> command received by the command processing unit 103*e*. The CPU 101 acquires the physical address included in the <Active Source> command as a result of analysis on the <Active Source> command, and stores the acquired physical address in the memory 102. The physical address acquired as a result of analysis on the <Active Source> command is hereinafter referred to as the "second physical address."

When the physical address acquired as a result of analysis on the <Set Stream Path> command is stored in the memory 102 (see step S404), the CPU 101 overwrites the currently stored address with the second physical address newly acquired from the <Active Source> command. When the second physical address has been updated to the physical address included in the <Active Source> command, the CPU 101 terminates the process of the flowchart illustrated in FIG. 4.

Next, a display processing that can be performed by the television 200 according to the first exemplary embodiment is described below with reference to FIG. 5.

FIG. 5 is a flowchart illustrating an example of the display process that can be performed by the television 200 according to the first exemplary embodiment. The display process is example process that can be performed by the television 200 to display video data received from the video camera 100 or video data received from the HDD 400 on the display unit 204. The CPU 201 executes a computer program stored in the memory 206 to control the display process described below with reference to FIG. 5.

In the first exemplary embodiment, the description will be made of a case where the display process is performed if it is already confirmed that the video camera 100 and the HDD 400 are operable in conformity with the CEC standard. Further, in the first exemplary embodiment, the CPU 201 controls the display process according to the computer program stored in the memory 206.

In step S501, the CPU 201 determines whether the television 200 is in the power off state. If it is determined that the television 200 is in the power off state (YES in step S501), the process of the flowchart returns from step S501 to step S501. If it is determined that the television 200 is not in the power off state (NO in step S501), the process of the flowchart proceeds from step S501 to step S502.

In step S502, the CPU 201 determines whether the television 200 is in the standby state. If it is determined that the television 200 is in the standby state (YES in step S502), the process of the flowchart returns from step S502 to step S501.

If it is determined that the television 200 is not in the standby state, the CPU 201 determines that the television 200 is in the power on state. In this case (NO in step S502), the process of the flowchart proceeds from step S502 to step S503. In general, the television 200 is brought into the standby state when the operational state changes from the power off state to the power on state.

Further, if the CPU 201 does not receive any input signal from the operation unit 205 or the remote control 209 during a predetermined period of time in a state where the television 200 is in the power on state, the operational state of the television 200 changes from the power on state to the standby state. The standby state is, for example, a state where no electric power is supplied from the power supply unit 207 to the display unit 204 of the television 200.

In step S503, the CPU 201 generates a <Request Active Source> command. Further, the CPU 201 supplies the generated <Request Active Source> command to the communication unit 203 and controls the communication unit 203 so as to transmit the <Request Active Source> command to the video camera 100 and the HDD 400.

The <Request Active Source> command is a CEC command usable to confirm whether the video camera 100 can transmit video data to the television 200 or the HDD 400 can transmit video data to the television 200. The <Request Active Source> command is a broadcast message defined according to the CEC standard. Hereinafter, the <Request Active Source> command is referred to as a "first CEC command."

After the communication unit 203 has transmitted the first CEC command to the video camera 100 and the HDD 400, the process of the flowchart proceeds from step S503 to step S504.

In step S504, the CPU 201 determines whether the communication unit 203 has received an <Active Source> command as an answering command responding to the first CEC command.

More specifically, when the video camera 100 that has received the first CEC command from the television 200 is in the active state, the video camera 100 transmits the second CEC command to the television 200 in response to the received first CEC command.

Further, when the HDD 400 receives the first CEC command from the television 200, the HDD 400 may respond to the first CEC command by transmitting to the television 200 the <Active Source> command including the physical address of the HDD 400 as an operand. In a case where the HDD 400 that has received the first CEC command from the television 200 can transmit video data to the television 200, the HDD 400 transmits the <Active Source> command including the physical address of the HDD 400 as an operand to the television 200.

If it is determined that the communication unit 203 has not received the <Active Source> command (NO in step S504), the process of the flowchart returns from step S504 to step S504.

If it is determined that the <Active Source> command has been received (YES in step S504), the CPU 201 controls the communication unit 203 so as to transmit the <Active Source> command to an apparatus other than the apparatus that has transmitted the <Active Source> command. In this case (YES in step S504), the process of the flowchart proceeds from step S504 to step S505.

In step S505, the CPU 201 analyzes the <Active Source> command received by the communication unit 203. The CPU 201 acquires a physical address included in the <Active Source> command as a result of analysis on the <Active Source> command and stores the acquired physical address in the memory 206. Hereinafter, the physical address acquired from the <Active Source> command received by the communication unit 203 is referred to as a "third physical address."

When the third physical address is stored in the memory 206, the CPU 201 selects either the HDMI terminal 203a or the HDMI terminal 203b according to the third physical address. Hence, when the storage of the third physical address in the memory 206 is completed, the process of the flowchart proceeds from step S505 to step S506.

In step S506, the CPU 201 determines whether the third physical address matches the physical address "1.0.0.0" corresponding to the HDMI terminal 203a.

If it is determined that the third physical address does not match the physical address "1.0.0.0" corresponding to the HDMI terminal 203a (NO in step S506), the CPU 201 determines that the third physical address is not "1.0.0.0." If the determination result is NO in step S506, the process of the flowchart proceeds from step S506 to step S509.

If it is determined that the third physical address matches the physical address "1.0.0.0" corresponding to the HDMI terminal 203a (YES in step S506), the CPU 201 determines that the third physical address is "1.0.0.0."

If the determination result is YES in step S506, the process of the flowchart proceeds from step S506 to step S507 and the CPU 201 selects the HDMI terminal 203a according to the third physical address "1.0.0.0."

In step S507, the CPU 201 selects the HDMI terminal 203a. Further, the CPU 201 controls the communication unit 203 so as to supply video data received via the HDMI terminal 203a to the display unit 204 and also controls the communication unit 203 so as to supply audio data received via the HDMI terminal 203a to the speaker unit.

Furthermore, the CPU 201 controls the communication unit 203 so as to supply auxiliary data received via the HDMI terminal 203a to the CPU 201. In this case, the CPU 201 controls the communication unit 203 so as not to supply video data received via the HDMI terminal 203b to the display unit 204 and also controls the communication unit 203 so as not to supply audio data received via the HDMI terminal 203b to the speaker unit.

Further, the CPU 201 controls the communication unit 203 so as not to supply auxiliary data received via the HDMI terminal 203b to the CPU 201. In this case, the process of the flowchart proceeds from step S507 to step S508.

In step S508, the CPU 201 controls the remote control signal reception unit 208 and the remote control 209 so as to set the video camera 100 connected via the HDMI cable 300 to the HDMI terminal 203a as an operational target in the remote control. If the setting of to the video camera 100 as the operational target of the remote control 209 is completed, the CPU 201 generates a CEC command according to an input signal from the remote control and controls the communication unit 203 so as to transmit the generated CEC command to the video camera 100. Thus, a remote control of the video camera 100 can be realized based on the CEC command generated according to a user's operation input via the remote control 209. In this case, the CPU 201 terminates the process of the flowchart illustrated in FIG. 5.

In step S509, the CPU 201 determines whether the third physical address matches the physical address corresponding to the HDMI terminal 203b and selects the HDMI terminal 203b according to a result of the determination. If it is determined that the third physical address matches the physical address corresponding to the HDMI terminal 203b, the CPU 201 controls the communication unit 203 so as to supply the video data received via the HDMI terminal 203b to the display unit 204. Further, in this case, the CPU 201 also controls the communication unit 203 so as to supply the audio data received via the HDMI terminal 203b to the speaker unit.

Furthermore, the CPU 201 controls the communication unit 203 so as to supply the auxiliary data received via the HDMI terminal 203b to the CPU 201. In this case, the CPU 201 controls the communication unit 203 so as not to supply the video data received via the HDMI terminal 203a to the display unit 204 and also controls the communication unit 203 so as not to supply the audio data received via the HDMI terminal 203a to the speaker unit.

Further, the CPU 201 controls the communication unit 203 so as not to supply the auxiliary data received via the HDMI terminal 203a to the CPU 201. In this case, the process of the flowchart proceeds from step S509 to step S510. If the third physical address does not match the physical address corresponding to the HDMI terminal 203b, the CPU 201 skips step S509 and step S510 and terminates the processing of the flowchart illustrated in FIG. 5.

In step S510, the CPU 201 controls the remote control signal reception unit 208 and the remote control 209 so as to set the HDD 400 connected via the HDMI cable 500 to the HDMI terminal 203b as an operational target in the remote control. If the setting of the HDD 400 as the operational target of the remote control 209 is completed, the CPU 201 terminates the process of the flowchart illustrated in FIG. 5.

Next, a physical address determination process that can be performed by the video camera 100 according to the first exemplary embodiment is described below with reference to FIG. 6.

FIG. 6 is a flowchart illustrating an example of the physical address determination process that can be performed by the video camera 100 according to the first exemplary embodiment.

In the first exemplary embodiment, the description will be made of a case where the physical address determination process is performed when the video camera 100 is supplying +5V power to the television 200 via the power line and the television 200 is executing the display process illustrated in FIG. 5. Further, in the first exemplary embodiment, the CPU 101 controls the physical address determination process according to a computer program stored in the memory 102.

In step S601, the CPU 101 controls the command processing unit 103e so as to generate a <Polling Message> command and transmit the generated <Polling Message> command to the television 200 via the CEC line 304. When the command processing unit 103e has transmitted the <Polling Message> command to the television 200, the process of the flowchart proceeds from step S601 to step S602.

In step S602, the CPU 101 determines whether the command processing unit 103e has received an ACK signal responding to the <Polling Message> command from the television 200. If it is determined that the ACK signal has not been received (NO in step S602), the process of the flowchart returns from step S602 to step S601. Similarly, if it is determined that the command processing unit 103e has received a NACK signal, the process of the flowchart returns from step S602 to step S601. If it is determined that the ACK signal has been received (YES in step S602), the process of the flowchart proceeds from step S602 to step S603.

In step S603, the CPU 101 determines whether the command processing unit 103e has received the first CEC command from the television 200 via the CEC line 304.

If it is determined that the first CEC command has not been received (NO in step S603), the process of the flowchart returns from step S603 to step S601.

If it is determined that the first CEC command has been received (YES in step S603), the CPU 101 determines whether the command processing unit 103e has received the <Active Source> command from the television 200. Hence, if the determination result is YES in step S603, the process of the flowchart proceeds from step S603 to step S604. The first CEC command received by the command processing unit 103e is the CEC command transmitted from the television 200 to the video camera 100 in the process of step S503.

In step S604, the CPU 101 determines whether the command processing unit 103e has received the <Active Source> command from the television 200 via the CEC line 304.

If it is determined that the <Active Source> command has been received (YES in step S604), the CPU 101 determines that the television 200 has received from the HDD 400 the <Active Source> command including the physical address of the HDD 400. When the television 200 receives from the HDD 400 the <Active Source> command including the physical address of the HDD 400 (YES in step S504), the CPU 201 executes a process of step S505 and subsequent steps.

If the determination result is YES in step S604, the CPU 101 determines that the television 200 has already selected the HDMI terminal 203b. Further, if the determination result is YES in step S604, the CPU 101 controls the command processing unit 103e so as not to transmit the second CEC command to the television 200 in response to the received first CEC command. If the determination result is YES in step S604, the CPU 101 terminates the process of the flowchart illustrated in FIG. 6.

If it is determined that the <Active Source> command has not been received (NO in step S604), the CPU 101 determines that the television 200 has not received from the HDD 400 the <Active Source> command including the physical address of the HDD 400. When the television 200 has not received from the HDD 400 the <Active Source> command including the physical address of the HDD 400, the CPU 201 repeats the process of step S504 until the television 200 receives the second CEC command from the video camera 100.

In this case, the television 200 operates so as not to select both the HDMI terminal 203a and the HDMI terminal 203b. If it is determined that the <Active Source> command has not been received (NO in step S604), the CPU 101 controls the command processing unit 103e so as to transmit the second CEC command to the television 200. Therefore, it is necessary for the CPU 101 to determine whether the second CEC command can be generated. Hence, if the determination result is NO in step S604, the process of the flowchart proceeds from step S604 to step S605.

In step S605, the CPU 101 determines whether the first physical address is stored in the memory 102. This is because the CPU 101 determines whether the second CEC command can be generated according to whether the first physical address is stored in the memory 102

If it is determined that the first physical address is not stored in the memory 102 (NO in step S605), the CPU 101 determines that the first EDID and the first physical address are not stored in the memory 102. When the first EDID and the first physical address are not stored in the memory 102, the CPU 101 determines that the video data complying with the first EDID and the second CEC command to be transmitted to the television 200 cannot be generated. Therefore, the CPU 101 performs a process for acquiring the first EDID and the first physical address from the television 200. Hence, if the determination result is NO in step S605, the process of the flowchart proceeds from step S605 to step S612.

If it is determined that the first physical address is stored in the memory 102 (YES in step S605), the CPU 101 determines that the first physical address and the first EDID are stored in the memory 102. If the determination result is YES in step S605, the process of the flowchart proceeds from step S605 to step S606. If the determination result is YES in step S605, the CPU 101 determines that the video data complying with the first EDID and the second CEC command to be transmitted to the television 200 can be generated.

Hence, before generating the second CEC command, to determine whether the video camera 100 is in the active state, the CPU 101 determines whether the data transmission unit 103d can transmit the video data complying with the first EDID to the television 200. This is because the CEC standard regulates the second CEC command so as to be transmitted to the television 200 as an answering command responding to the first CEC command when the video camera 100 is in the active state.

Further, before generating the second CEC command, the CPU 101 determines whether the first physical address is correct. This is to prevent the television 200 erroneously selecting an apparatus other than the video camera 100 being currently in the active state as an operational target in the remote control due to transmission of an incorrect first physical address from the video camera 100 to the television 200, In step S606, the CPU 101 determines whether the second physical address is stored in the memory 102. This is because the CPU 101 determines whether the data transmission unit 103d can transmit the video data complying with the first EDID to the television 200 based on a comparison between the first physical address and the second physical address. Further, the CPU 101 determines whether the first physical address is correct based on the comparison of the above addresses.

If it is determined that the second physical address is not stored in the memory 102 (NO in step S606), the CPU 101 cannot compare the first physical address with the second physical address. If the determination result is NO in step S606, the CPU 101 cannot determine whether the data transmission unit 103d can transmit the video data complying with the first EDID to the television 200 based on the comparison between the first physical address and the second physical address. Further, if the determination result is NO in step S606, the CPU 101 cannot determine whether the first physical address is correct based on the comparison between the first physical address and the second physical address.

Therefore, if the determination result is NO in step S606, the CPU 101 uses the HPD signal and the Rx sense to determine whether the data transmission unit 103d can transmit the video data complying with the first EDID to the television 200 and to determine whether the first physical address is correct. Hence, if the determination result is NO in step S606, the process of the flowchart proceeds from step S606 to step S608.

If it is determined that the second physical address is stored in the memory 102 (YES in step S606), the CPU 101 can compare the first physical address with the second physical address. If the determination result is YES in step S606, the CPU 101 compares the first physical address with the second physical address. If the determination result is YES in step S606, the process of the flowchart proceeds from step S606 to step S607.

In step S607, the CPU 101 determines whether the first physical address stored in the memory 102 matches the second physical address.

If it is determined that the first physical address matches the second physical address (YES in step S607), the CPU 101 determines that the data transmission unit 103d can transmit the video data complying with the first EDID to the television 200 and determines that the first physical address is correct.

This is because, if the determination result is YES in step S607, the CPU 101 determines that the terminal selected by the television 200 is the HDMI terminal 203a corresponding to the video camera 100 in the same manner as the above-described process performed when the determination result is YES in step S406 of the second physical address acquisition process. Further, if the determination result is YES in step S607, the CPU 101 determines that the data transmission unit 103d is operating to transmit the video data (see step S407) and the command processing unit 103e is operating to transmit the second CEC command to the television 200 (see step S408).

Therefore, if the determination result is YES in step S607, the CPU 101 determines that the video camera 100 is in the active state because it is already confirmed that the data transmission unit 103d is operating to transmit the video data complying with the first EDID to the television 200. Further, accordingly, if the determination result is YES in step S607, the CPU 101 determines that the first physical address is correct because it is already confirmed that the first physical address matches the physical address of the HDMI terminal 203a selected by the television 200. If the determination result is YES in step S607, the process of the flowchart proceeds from step S607 to step S610.

If it is determined that the first physical address does not match the second physical address (NO in step S607), the CPU 101 cannot determine whether the data transmission unit 103d can transmit the video data complying with the first EDID to the television 200. Further, if the determination result is NO in step S607, the CPU 101 cannot determine that the first physical address is correct.

The first physical address does not match the second physical address when the terminal selected by the television 200 is the HDMI terminal 203b corresponding to the HDD 400 or when the first physical address is incorrect. Therefore, when the terminal selected by the television 200 is the HDMI terminal 203b corresponding to the HDD 400, the first physical address does not match the second physical address representing the HDMI terminal 203b. When the first physical address is incorrect, even if the second physical address represents the physical address of the HDMI terminal 203a, the first physical address does not match the second physical address representing the physical address of the HDMI terminal 203a.

If the determination result is NO in step S607, the CPU 101 cannot determine whether the data transmission unit 103d can transmit the video data complying with the first EDID to the television 200 based on the comparison between the first physical address and the second physical address. Further, if the determination result is NO in step S607, the CPU 101 cannot determine whether the first physical address is correct based on the comparison between the first physical address and the second physical address.

Therefore, if the determination result is NO in step S607, the CPU 101 uses the HPD signal and the Rx sense to determine whether the data transmission unit 103d can transmit the video data complying with the first EDID to the television 200 and determine whether the first physical address is correct. Hence, if the determination result is NO in step S607, the process of the flowchart proceeds from step S607 to step S608.

In step S608, the CPU 101 determines whether the HPD signal detected by the first connection detection unit 103a is an "H" level HPD signal. The CPU 101 determines whether the first EDID is correctly acquired from the television 200 by checking whether the HPD signal is the "H" level HPD signal.

If it is determined that the HPD signal is an "L" level HPD signal (NO in step S608), the CPU 101 determines that the television 200 has rewritten information included in the first EDID stored in the first EDID memory 203c. Therefore, the first EDID stored in the memory 102 of the video camera 100 may not match the first EDID stored in the first EDID memory 203c of the television 200.

Therefore, if the determination result is NO in step S608, the CPU 101 determines that the first EDID stored in the memory 102 is an incorrectly acquired EDID and further determines that the first physical address included in the incorrectly acquired first EDID is also incorrect.

If the determination result is NO in step S608, the CPU 101 does not generate video data to be transmitted to the television 200 according to the first EDID. Therefore, the data transmission unit 103d cannot transmit any video data to the television 200. If the determination result is NO in step S608, the process of the flowchart proceeds from step S607 to step S611. In step S611, the CPU 101 performs a process for deleting the first EDID and the first physical address or a process for invalidating the first EDID and the first physical address.

If it is determined that the HPD signal is an "H" level HPD signal (YES in step S608), the CPU 101 determines that the television 200 has not rewritten the information included in the first EDID stored in the first EDID memory 203c. If the determination result is YES in step S608, the CPU 101 determines that the first EDID stored in the memory 102 is a correctly acquired EDID and the first physical address included in the correctly acquired first EDID is also correct.

If the determination result is YES in step S608, the CPU 101 generates video data to be transmitted to the television 200 according to the first EDID. Hence, if the determination result is YES in step S608, the process of the flowchart proceeds from step S608 to step S609.

In step S609, the CPU 101 determines whether the Rx sense detected by the second connection detection unit 103b is an "H" level Rx sense.

If the determination result is YES in step S608, the CPU 101 determines whether the data transmission unit 103d can transmit the video data complying with the first EDID to the television 200 by checking whether the Rx sense is an "H" level Rx sense. The CPU 101 further determines whether the first physical address is correct by checking whether the Rx sense is an "H" level Rx sense.

If it is determined that the Rx sense is an "L" level Rx sense (NO in step S609), the CPU 101 determines that the data transmission unit 103d cannot transmit the video data complying with the first EDID to the television 200. If the determination result is NO in step S609, the CPU 101 controls the data transmission unit 103d so as not to transmit the video data complying with the first EDID to the television 200 unless the Rx sense changes from "L" level to "H" level.

Further, if the determination result is NO in step S609, the CPU 101 controls the command processing unit 103e so as not to transmit the second CEC command to the television 200 unless the Rx sense changes from "L" level to "H" level. If it is determined that the Rx sense is an "L" level Rx sense (NO in step S609), the process of the flowchart returns from step S609 to step S604.

If it is determined that the Rx sense is an "H" level Rx sense (YES in step S609), the CPU 101 determines that the data transmission unit 103d can transmit video data to the television 200 and therefore the video camera 100 is in the active state. Further, if the determination result is YES in step S609, the CPU 101 determines that the first physical address is correct because the HDMI terminal 203a corresponding to the video camera 100 matches the HDMI terminal 203a selected by the television 200. In this case (YES in step S609), the process of the flowchart proceeds from step S609 to step S610.

In step S610, the CPU 101 generates the second CEC command. The CPU 101 supplies the generated second CEC command to the command processing unit 103e and controls the command processing unit 103e so as to transmit the generated second CEC command to the television 200 and the HDD 400. When the command processing unit 103e has transmitted the second CEC command to the television 200 and the HDD 400, the CPU 101 terminates the process of the flowchart illustrated in FIG. 6.

In step S611, the CPU 101 deletes the first physical address, the first EDID, and information acquired as a result of analysis on the first EDID which are stored in the memory 102. In other words, the CPU 101 prevents the data transmission unit 103d from transmitting video data complying with the incorrectly acquired first EDID to the television 200.

Further, the CPU 101 prevents the command processing unit 103e from transmitting to the television 200 the CEC command corresponding to the first physical address included in the incorrectly acquired first EDID. When the CPU 101 has deleted or invalidated the first physical address, the first EDID, and the information acquired as a result of analysis on the first EDID stored in the memory 102, the process of the flowchart proceeds from step S611 to step S612.

In step S612, the CPU 101 executes the first physical address acquisition process illustrated in FIG. 3. If the CPU 101 completes the first physical address acquisition process illustrated in FIG. 3, the process of the flowchart returns from step S612 to step S604.

As described above, the video camera 100 according to the first exemplary embodiment determines whether the first physical address included in the second CEC command is correct before generating the second CEC command when the video camera 100 has received the first CEC command from the television 200.

Further, in the first exemplary embodiment, the video camera 100 determines whether the first physical address is correct by comparing the first physical address with the second physical address.

Thus, if it is determined that the first physical address matches the first physical address (YES in step S607), the video camera 100 determines that the terminal selected by the television 200 is the HDMI terminal 203a corresponding to the video camera 100 being in the active state. In this case (YES in step S607), the video camera 100 confirms the active state thereof and further determines that the first physical address is correct.

Further, if it is determined that the second physical address has not been acquired (NO in step S606), the video camera 100 determines whether the video camera 100 is in the active state using a method other than the above-described comparison between the first physical address and the second physical address. Further, if it is determined that the first physical address does not match the second physical address (NO in step S607), the video camera 100 determines whether the first physical address is correct using a method other than the above-described comparison between the first physical address and the second physical address.

For example, as a method not relying on the comparison between the first physical address and the second physical address, the video camera 100 refers to the HPD signal and the Rx sense to determine whether the video camera 100 itself is in the active state and determine whether the first physical address is correct.

If it is determined that the HPD signal and the Rx sense is the "H" level (YES in step S608 and YES in step S609), the video camera 100 determines that the terminal selected by the television 200 is the HDMI terminal 203a corresponding to the video camera 100 being in the active state. In this case (YES in step S608 and YES in step S609), the video camera 100 confirms the active state thereof and further determines that the first physical address is correct.

As described above, when the video camera 100 determines that the physical address of the video camera 100 (i.e., the first physical address) is correct, the video camera 100 transmits the <Active Source> command including the physical address of the video camera 100 to the television 200.

As a result, if the television 200 has received the <Active Source> command including the physical address of the video camera 100, the television 200 selects the video camera 100 as an operational target to be controlled based on the CEC command according to the physical address of the video camera 100.

Therefore, when the television 200 has received the <Active Source> command including the physical address of the video camera 100, the television 200 can surely prevent an apparatus other than the video camera 100 from being selected as an operational target to be controlled based on the CEC command. Further, when the television 200 has received the <Active Source> command including the physical address of the video camera 100, the television 200 can correctly display the video data received from the video camera 100.

Further, if it is determined that the HPD signal is an "L" level HPD signal or the Rx sense is an "L" level Rx sense (NO in step S608 or NO in step S609), the video camera 100 determines that the video camera 100 itself is not in the active state or determines that the first physical address is incorrect.

In this case, the video camera 100 does not transmit the second CEC command including the first physical address to the television 200.

Therefore, when the television 200 has received the <Active Source> command including an incorrect physical address of the video camera 100, the television 200 can surely prevent an apparatus other than the video camera 100 from being selected as an operational target to be controlled based on the CEC command. Further, when the television 200 has received the <Active Source> command including an incorrect physical address of the video camera 100, the television 200 does not display any video data received from an apparatus other than the video camera 100.

The communication apparatus according to the present invention is not limited to the communication apparatus 100 described in the first exemplary embodiment. For example, the communication apparatus according to the present invention can be realized as a system including a plurality of apparatuses.

Further, the configurations and functions described in the first exemplary embodiment can be realized by a computer-executable program. In this case, the computer can read the computer program from a computer-readable storage medium and can executed the read computer program. Further, in this case, the computer-readable storage medium can be, for example, any one of a hard disk apparatus, an optical disk, a compact disc-read only memory (CD-ROM), a CD-recordable (CD-R), a memory card, and a ROM. Alternatively, the computer-readable storage medium can be any other form of non-transitory computer-readable memory. Further, the computer program can be provided from an external apparatus via a communication interface to the computer and can be executed by computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288810 filed Dec. 21, 2009, which is hereby incorporated by reference herein in its entirety.

What is claimed is:

1. A communication apparatus comprising:
a transmission unit that transmits video data to an external apparatus;
a command processing unit that transmits a first command to the external apparatus, wherein the first command includes a command for causing the external apparatus to display video data to be transmitted from the transmission unit to the external apparatus;
an acquisition unit that acquires a first physical address from predetermined information of the external apparatus; and
a control unit that (a) determines whether or not a third command is received from the external apparatus by the command processing unit, (b) determines whether or not a fourth command is received by the command processing unit after the third command is received from the external apparatus, (c) determines whether or not the first physical address is acquired from the predetermined information if the command processing unit does not receive the fourth command after the third command is received, (d) determines whether or not a second physical address is acquired from a second command, received by the command processing unit, if the command processing unit does not receive the fourth command after the third command is received, (e) determines whether or not the first physical address matches the second physical address if the command processing unit does not receive the fourth command after the third command is received, and (f) controls the command processing unit to transmit the first command including the first physical address to the external apparatus if the first physical address matches the second physical address,
wherein the second command includes a command indicating that the external apparatus displays video data to be transmitted to the external apparatus from the transmission unit, the third command includes a command for requesting the first command, the fourth command includes a command indicating that the external apparatus displays video data to be transmitted to the external apparatus from a transmission apparatus, and the transmission apparatus is different from the communication apparatus;
a first detection unit that performs a process for detecting a first signal indicating a state where the external apparatus allows the communication apparatus to acquire the predetermined information; and
a second detection unit that performs a process for detecting a second signal indicating a state where the external apparatus displays video data to be transmitted from the transmission unit to the external apparatus.

2. The communication apparatus according to claim 1, wherein the control unit controls, based on a detection result of the first detection unit and a detection result of the second detection unit, whether or not to transmit the first command including the first physical address to the external apparatus if the first physical address does not match the second physical address.

3. The communication apparatus according to claim 2, wherein the control unit controls the command processing unit to transmit the first command including the first physical address to the external apparatus after the first signal and the second signal are detected if the first physical address does not match the second physical address.

4. The communication apparatus according to claim 2, wherein the control unit controls the command processing unit not to transmit the first command including the first physical address to the external apparatus before the first signal is detected if the first physical address does not match the second physical address.

5. The communication apparatus according to claim 2, wherein the control unit controls the command processing unit not to transmit the first command including the first physical address to the external apparatus before the second signal is detected even if the first signal is detected if the first physical address does not match the second physical address.

6. The communication apparatus according to claim 1, wherein the first command includes an <Active Source> command and the second command includes a <Set Stream Path> command.

7. The communication apparatus according to claim 1, wherein the communication apparatus conforms to High Definition Multimedia Interface (HDMI) standard.

8. The communication apparatus according to claim 1, wherein the predetermined information includes one of Extended display identification data (EDID) and Enhanced Extended Identification Data (E-EDID).

9. The communication apparatus according to claim 2, wherein the control unit performs a process for acquiring the first physical address from the external apparatus again if the first physical address does not match the second physical address and the first signal is not detected.

10. The communication apparatus according to claim 2, further comprising a memory that stores the first physical address, wherein the control unit performs a process for deleting the first physical address from the memory if the first physical address does not match the second physical address and the first signal is not detected.

11. The communication apparatus according to claim 2, wherein the first signal is related to a Hot Plug Detect (HPD) signal.

12. The communication apparatus according to claim 2, wherein the second signal is related to a signal indicating whether or not a transmission line is connected to a terminal resistor of the external apparatus, and the transmission line is used for transmitting video data to the external apparatus.

13. A method for controlling a communication apparatus, wherein the communication apparatus includes a transmission unit that transmits video data to an external apparatus, a command processing unit that transmits a first command to the external apparatus, and an acquisition unit that acquires a first physical address from predetermined information of the external apparatus, and wherein the first command includes a command for causing the external apparatus to display video data to be transmitted from the transmission unit to the external apparatus, the method comprising:
   determining whether or not a third command is received from the external apparatus by the command processing unit, wherein the third command includes a command for requesting the first command;
   determining whether or not a fourth command is received by the command processing unit after the third command is received from the external apparatus, wherein the fourth command includes a command indicating that the external apparatus displays video data to be transmitted to the external apparatus from a transmission apparatus, and the transmission apparatus is different from the communication apparatus;
   determining whether or not the first physical address is acquired from the predetermined information if the command processing unit does not receives the fourth command after the third command is received;
   determining whether or not a second physical address is acquired from a second command, received by the command processing unit, if the command processing unit does not receive the fourth command after the third command is received, wherein the second command includes a command indicating that the external apparatus displays video data to be transmitted to the external apparatus from the transmission unit;
   determining whether the first physical address matches the second physical address if the command processing unit does not receive the fourth command after the third command is received;
   controlling the command processing unit to transmit the first command including the first physical address to the external apparatus if the first physical address matches the second physical address;
   performing a process for detecting a first signal indicating a state where the external apparatus allows the communication apparatus to acquire the predetermined information; and
   performing a process for detecting a second signal indicating a state where the external apparatus displays video data to be transmitted from the transmission unit to the external apparatus.

14. The method according to claim 13, further comprising controlling the command processing unit to transmit the first command including the first physical address to the external apparatus after the first signal and the second signal are detected if the first physical address does not match the second physical address.

15. The method according to claim 14, further comprising controlling the command processing unit not to transmit the first command including the first physical address to the external apparatus before the first signal is detected if the first physical address does not match the second physical address.

16. The method according to claim 14, further comprising controlling the command processing unit not to transmit the first command including the first physical address to the external apparatus before the second signal is detected even if the first signal is detected if the first physical address does not match the second physical address.

17. The method according to claim 13, wherein the first command includes an <Active Source> command and the second command includes a <Set Stream Path> command.

18. The method according to claim 13, wherein the communication apparatus conforms to High Definition Multimedia Interface (HDMI) standard.

19. The method according to claim 13, wherein the predetermined information includes one of Extended display identification data (EDID) and Enhanced Extended Identification Data (E-EDID).

20. A non-transitory computer-readable storage medium storing a program, wherein the program causes a computer to perform a method of controlling a communication apparatus, wherein the communication apparatus includes a transmission unit that transmits video data to an external apparatus, a command processing unit that transmits a first command to the external apparatus, and an acquisition unit that acquires a first physical address from predetermined information of the external apparatus, and wherein the first command includes a command for causing the external apparatus to display video data to be transmitted from the transmission unit to the external apparatus, the method comprising:
   determining whether or not a third command is received from the external apparatus by the command processing unit, wherein the third command includes a command for requesting the first command;
   determining whether or not a fourth command is received by the command processing unit after the third command is received from the external apparatus, wherein the fourth command includes a command indicating that the external apparatus displays video data to be transmitted to the external apparatus from a transmission apparatus, and the transmission apparatus is different from the communication apparatus;
   determining whether or not the first physical address is acquired from the predetermined information if the command processing unit does not receive the fourth command after the third command is received;
   determining whether or not a second physical address is acquired from a second command, received by the command processing unit, if the command processing unit does not receive the fourth command after the third command is received, wherein the second command includes a command indicating that the external apparatus displays video data to be transmitted to the external apparatus from the transmission unit;

determining whether the first physical address matches the second physical address if the command processing unit does not receive the fourth command after the third command is received; and controlling the command processing unit to transmit the first command including the first physical address to the external apparatus if the first physical address matches the second physical address;

performing a process for detecting a first signal indicating a state where the external apparatus allows the communication apparatus to acquire the predetermined information; and performing a process for detecting a second signal indicating a state where the external apparatus displays video data to be transmitted from the transmission unit to the external apparatus.

* * * * *